US009074786B2

(12) United States Patent
Gyota et al.

(10) Patent No.: US 9,074,786 B2
(45) Date of Patent: Jul. 7, 2015

(54) AIR CONDITIONER CONTROL DEVICE, AIR-CONDITIONING SYSTEM, FACILITY/EQUIPMENT SYSTEM, AIR CONDITIONER CONTROL METHOD, AND RECORDING MEDIUM STORING AIR CONDITIONER CONTROL PROGRAM

(75) Inventors: Tomoaki Gyota, Chiyoda-ku (JP); Masanori Nakata, Chiyoda-ku (JP); Takeru Kuroiwa, Chiyoda-ku (JP)

(73) Assignee: MITSUBISHI ELECTRIC CORPORATION, Chiyoda-ku, Tokyo (JP)

(*) Notice: Subject to any disclaimer, the term of this patent is extended or adjusted under 35 U.S.C. 154(b) by 671 days.

(21) Appl. No.: 13/496,780

(22) PCT Filed: Apr. 9, 2010

(86) PCT No.: PCT/JP2010/056481
§ 371 (c)(1),
(2), (4) Date: Mar. 16, 2012

(87) PCT Pub. No.: WO2011/033805
PCT Pub. Date: Mar. 24, 2011

(65) Prior Publication Data
US 2012/0179299 A1    Jul. 12, 2012

(30) Foreign Application Priority Data

Sep. 17, 2009   (JP) ................. 2009-215729

(51) Int. Cl.
*F24F 11/00* (2006.01)
*F24F 11/06* (2006.01)
*G05D 23/00* (2006.01)

(52) U.S. Cl.
CPC .............. *F24F 11/006* (2013.01); *G05D 23/00* (2013.01); *F24F 2011/0063* (2013.01)

(58) Field of Classification Search
CPC . F24F 11/006; F24F 2011/0063; G05D 23/00
USPC ................... 700/17, 28, 32, 83, 276
See application file for complete search history.

(56) References Cited

U.S. PATENT DOCUMENTS 8,635,320 B2 *   1/2014   Ishizaka ................ 709/223
2002/0029096 A1 *   3/2002   Takai et al. ............ 700/276

(Continued)

FOREIGN PATENT DOCUMENTS

CN   1135032 A   11/1996
EP   2154438 A1 *   2/2010

(Continued)

OTHER PUBLICATIONS

International Search Report (PCT/ISA/210) issued on Jun. 29, 2010, by Japanese Patent Office as the International Searching Authority for International Application No. PCT/JP2010/056481.

(Continued)

*Primary Examiner* — Robert Fennema
*Assistant Examiner* — Jennifer L Norton
(74) *Attorney, Agent, or Firm* — Buchanan Ingersoll & Rooney PC

(57) ABSTRACT

A system communicator receives from a network signals indicating the state of an air conditioner, and updates the content of an air-conditioning information memory. An automatic control rule memory stores automatic control rules which are used when an air conditioner control content is determined. An air conditioner automatic controller determines the air conditioner control content based on the content of the air-conditioning information memory and the automatic control rules recorded in the automatic control rule memory, and changes the content of the air-conditioning information memory. A rule adjustment screen generator stores, in a rule adjustment screen memory, screen creation information generated based on the content of the automatic control rule memory. A rule adjustment operator displays the content of the rule adjustment screen memory as a screen, and receives an operation to adjust the content of the automatic control rule memory.

14 Claims, 11 Drawing Sheets

(56) References Cited

U.S. PATENT DOCUMENTS

2004/0027390 A1* 2/2004 Yamato et al. ............... 345/806
2008/0277486 A1* 11/2008 Seem et al. ............... 236/49.3
2014/0371924 A1* 12/2014 Kodama et al. ............... 700/276

FOREIGN PATENT DOCUMENTS

| JP | 2003-021380 A | 1/2003 |
| JP | 2003-083596 A | 3/2003 |
| JP | 2004-003852 A | 1/2004 |
| JP | 2005-215789 A | 8/2005 |
| JP | 2008-032288 A | 2/2008 |

OTHER PUBLICATIONS

Written Opinion (PCT/ISA/237) issued on Jun. 29, 2010, by Japanese Patent Office as the International Searching Authority for International Application No. PCT/JP2010/056481.

Office Action issued on Dec. 27, 2013 by the Chinese Patent Office in corresponding Chinese Patent Application No. 201080041214.3, and an English Translation of the Office Action. (11 pages).

* cited by examiner

FIG.2

| AIR-CONDITIONING INFORMATION NUMBER | ADDRESS | SIZE | VALUE | (REMARKS) |
|---|---|---|---|---|
| 1 | 0x0001 | 2 BYTE | 27 | °C |
| 2 | 0x0003 | 1 BYTE | 80 | % |
| 3 | 0x0004 | 1 BYTE | 0 | OFF |
| 4 | 0x0005 | 1 BYTE | 2 | HIGH |
| ⋮ | ⋮ | ⋮ | ⋮ | ⋮ |

FIG.3

| INPUT NUMBER | INPUT INFORMATION NUMBER | OPERATOR | INPUT EVALUATION VALUE |
|---|---|---|---|
| 1 | 1 | > | 26 |
| 2 | 2 | > | 70 |
| ⋮ | ⋮ | ⋮ | ⋮ |

FIG.4

| OUTPUT NUMBER | OUTPUT INFORMATION NUMBER | OUTPUT-SETTING VALUE |
|---|---|---|
| 1 | 3 | 2 |
| 2 | 4 | 1 |
| ⋮ | ⋮ | ⋮ |

| ATTRIBUTE | OPERATOR | ICON |
|---|---|---|
| TEMPERATURE | (DEFAULT) | THERMOMETER |
| | > | LOWER LIMIT THERMOMETER |
| | < | UPPER LIMIT THERMOMETER |
| HUMIDITY | (DEFAULT) | WATER DROPLET |
| | > | LOWER LIMIT WATER DROPLET |
| | < | UPPER LIMIT WATER DROPLET |
| OPERATION MODE | (DEFAULT) | OFF/HEAT/COOL |
| AIR FLOW | (DEFAULT) | THREE-LEVEL AIR FLOW |
| ⋮ | ⋮ | ⋮ |

| INPUT/OUTPUT CLASSIFIER | INPUT/OUTPUT NUMBER |
|---|---|
| INPUT | 2 |
| OUTPUT | 2 |
| ⋮ | ⋮ |

| LINKAGE NUMBER | INPUT/OUTPUT CLASSIFIER | INPUT/OUTPUT NUMBER |
|---|---|---|
| 1 | INPUT | 1 |
| 1 | INPUT | 2 |
| ⋮ | ⋮ | ⋮ |

| LINKAGE NUMBER | INPUT/OUTPUT CLASSIFIER | INPUT/OUTPUT NUMBER | ICON | CONTROL VALUE | CONTROL VALUE ADJUSTMENT PERMISSION | EXECUTION INFORMATION | EXECUTION ADJUSTMENT PERMISSION |
|---|---|---|---|---|---|---|---|
| 1 | INPUT | 1 | LOWER LIMIT THERMOMETER | 26 | PROHIBITED | VALID | PERMITTED |
| | INPUT | 2 | LOWER LIMIT WATER DROPLET | 70 | PERMITTED | VALID | PERMITTED |
| | OUTPUT | 1 | OFF/HEAT/COOL | 2 | PROHIBITED | VALID | PROHIBITED |
| | OUTPUT | 2 | THREE-LEVEL AIR FLOW | 1 | PERMITTED | VALID | PROHIBITED |
| ⋮ | ⋮ | ⋮ | ⋮ | ⋮ | ⋮ | ⋮ | ⋮ |

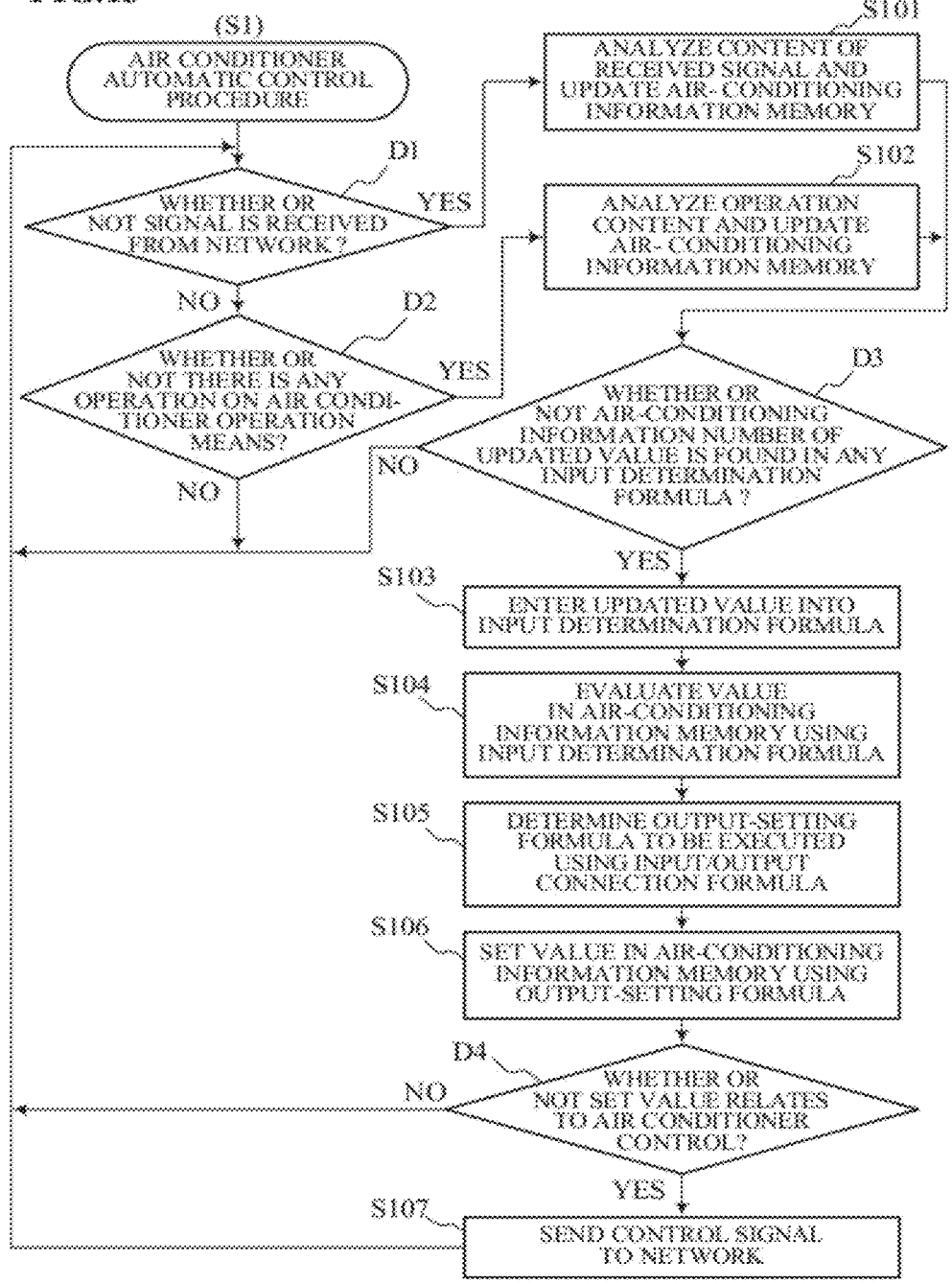

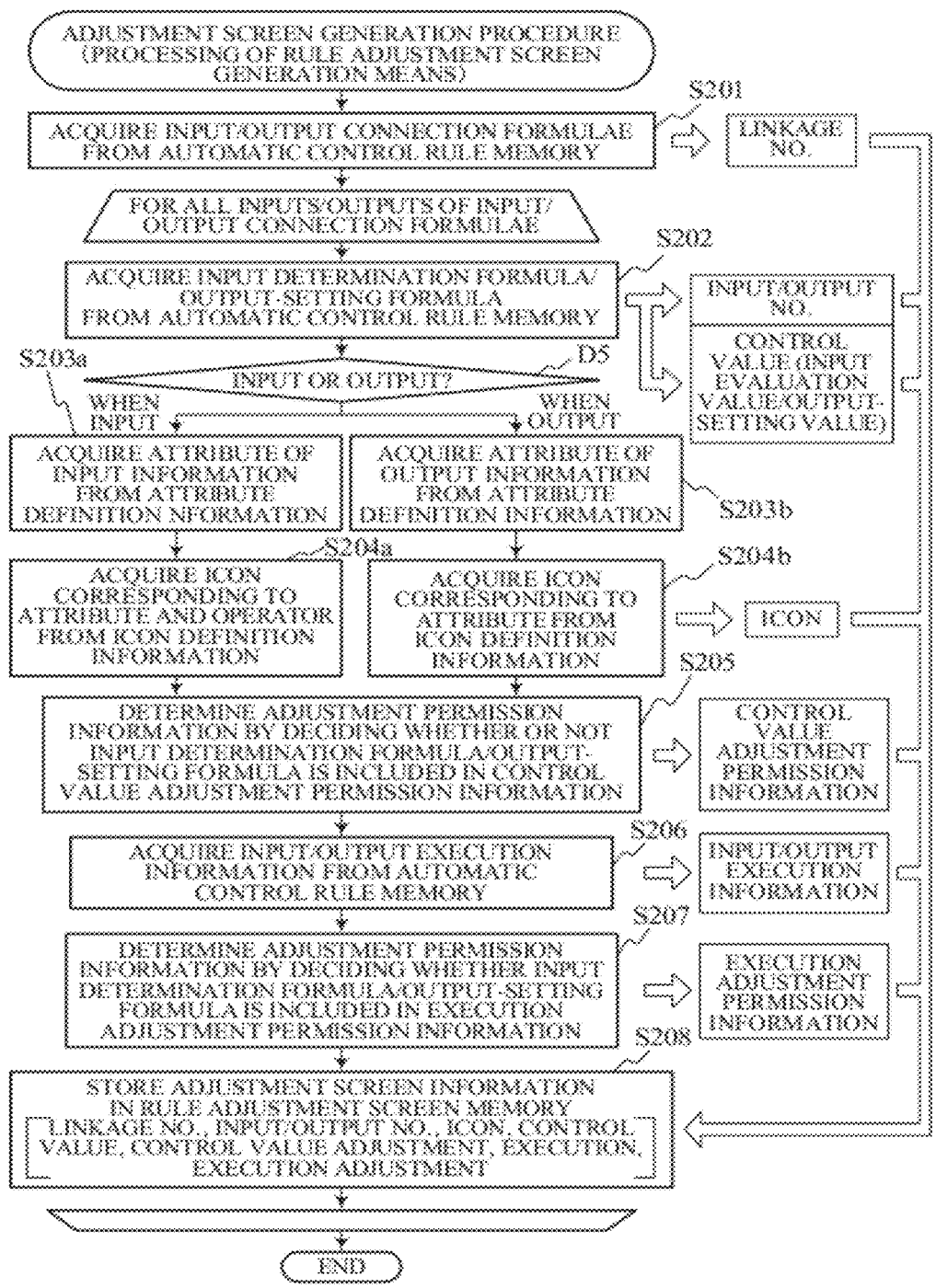

AIR CONDITIONER CONTROL DEVICE, AIR-CONDITIONING SYSTEM, FACILITY/EQUIPMENT SYSTEM, AIR CONDITIONER CONTROL METHOD, AND RECORDING MEDIUM STORING AIR CONDITIONER CONTROL PROGRAM

TECHNICAL FIELD

The present invention relates to an air conditioner control device, air-conditioning system, facility/equipment system, air conditioner control method, and air conditioner control program for controlling air conditioner in an air-conditioning system in which plural air conditioners are communicably connected via a network.

BACKGROUND ART

Air-conditioning systems in which plural air conditioners are communicably connected to a controller via a network such as Ethernet (registered trademark) in a store or office building have been proposed (for example, see Patent Literature 1). Generally, such a controller controls the air conditioner by using a control program stored in a built-in memory.

On the other hand, controllers that allow an operator (mainly, a building administrator or local service engineer) to newly define a control program that makes an individual air conditioner specifically suitable to various installation environments have also been proposed (for example, see Patent Literature 2).

PRIOR ART DOCUMENT

Patent Literature

Patent Literature 1: Unexamined Japanese Patent Application Kokai Publication No. 2004-3852; and
Patent Literature 2: Unexamined Japanese Patent Application Kokai

DISCLOSURE OF INVENTION

Problem to be Solved by the Invention

However, the controller described in the Patent Literature 2 does not allow a resident (mainly, an employee in the building or a user of the building) to adjust the control content of the control program that have newly been defined by the operator according to their preference or daily changes in the environmental conditions.

The present invention is conceived in view of the above circumstances. Accordingly, an objective of the present invention is to provide an air conditioner control device, air-conditioning system, facility/equipment system, air conditioner control method, and air conditioner control program that allows the resident to change the control content of the control program.

Means for Solving the Problem

The air conditioner control device according to the present invention is an air conditioner control device for controlling at least one air conditioner connected to a network, comprising an air-conditioning information memory, an automatic control rule memory, an air conditioner operation means, an air conditioner automatic control means, a system communication means, a rule adjustment screen memory, a rule adjustment screen creation means, and a rule adjustment operation means. The air-conditioning information memory stores the state of the air conditioner as air-conditioning information. The automatic control rule memory stores automatic control rule serving as criteria for determining a control content of the air conditioner. The air conditioner operation means receives an operation that changes the air-conditioning information. The air conditioner automatic control means determines the control content of the air conditioner based on the air-conditioning information and automatic control rules, and changes the content in a corresponding part of the air-conditioning information stored in the air-conditioning information memory to the determined control content. The system communication means receives a signal indicating the state of the air conditioner from the network, updates the content of the air-conditioning information memory, and sends to the network the update of the air-conditioning information and the control content of the air conditioner determined in accordance with the change as control signals. The rule adjustment screen memory stores adjustment screen information that is information for creating a rule adjustment screen used for changing the content of the automatic control rule memory. The rule adjustment screen generation means generates the adjustment screen information based on the content of the automatic control rule memory and stores the adjustment screen information in the rule adjustment screen memory. The rule adjustment operation means creates the rule adjustment screen based on the adjustment screen information, displays the rule adjustment screen on a display device, and receives an operation to adjust the content of the automatic control rule memory on the displayed rule adjustment screen.

Effect of the Invention

The air conditioner control device, air-conditioning system, facility/equipment system, air conditioner control method, and air conditioner control program according to the present invention allow a resident to easily change (or adjust hereafter) the control content defined by the operator, thereby achieving an air conditioner control that is suitable for the preference of the resident or daily changes in the environmental conditions.

BRIEF DESCRIPTION OF DRAWINGS

FIG. 2 shows an example of the air-conditioning information according to Embodiment 1;
FIG. 3 shows examples of the input determination formula according to Embodiment 1;
FIG. 4 shows examples of the output-setting formula according to Embodiment 1;
FIG. 10 shows an example of the control value adjustment permission information according to Embodiment 1;

FIG. 11 shows an example of the execution adjustment permission information according to Embodiment 1;

FIG. 12 shows an example of the adjustment screen information according to Embodiment 1;

FIG. 13 is a flowchart showing the content of the air conditioner automatic control procedure according to Embodiment 1;

FIG. 14 is a flowchart showing the content of the adjustment screen generation procedure according to Embodiment 1;

BEST MODES FOR CARRYING OUT THE INVENTION

Embodiment 1

(Configuration of Air Conditioner Control Device 10)

Figure 1:
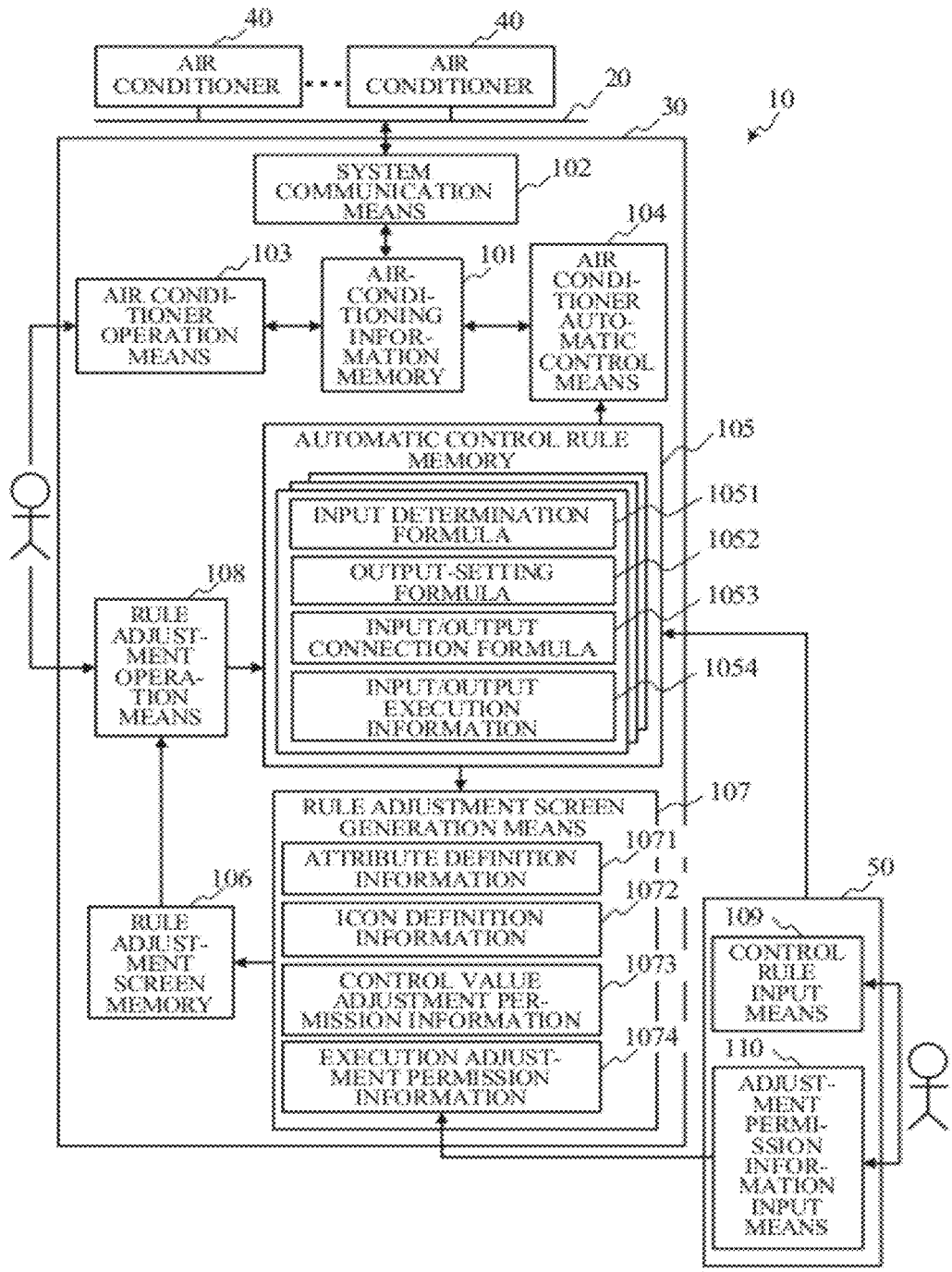
FIG. 1 is a block diagram showing an exemplary configuration of the air conditioner control device according to Embodiment 1 of the present invention and periphery thereof.

FIG. 1 is a block diagram showing an exemplary configuration of an air conditioner control device 10 according to Embodiment 1 of the present invention and periphery thereof.

As shown in FIG. 1, the air conditioner control device 10 comprises a remote controller 30 and a terminal 50. The remote controller 30 is connected to an air-conditioning system network 20. At least one air conditioner 40 is connected to the network 20. The network 20 can be a wired network or wireless network. The air conditioner 40 and air conditioner control device 10 are collectively called an air-conditioning system (an A/C system). The network 20 can be included in the A/C system.

The remote controller 30 is a unit used by a resident (mainly, an employee of companies having offices in the building or a person living in the building) for an operation that changes various settings of the air conditioner 40. The remote controller 30 may be provided for each air conditioner 40 or may be a centralized remote controller that collectively managing plural air conditioner 40 on each floor.

The terminal 50 is a unit such as a PC (personal computer) connected to the remote controller 30 so as to change settings of the remote controller 30. The terminal 50 is supposed to be operated by an operator (mainly, a building administrator or local service engineer) and is capable of sending the content of operation by the operator to the remote controller 30.

First, the operation of the air conditioner control device 10 will be outlined.

The resident can set the operation content of the air conditioner 40 by operating the remote controller 30. For example, possible operations include turning the power on/off, switching an operation mode (air-conditioning, heating, and/or the like), changing a temperature setting, changing a humidity setting, and changing an air flow setting of the air conditioner 40.

On the other hand, the remote controller 30 can automatically control the operation content of the air conditioner 40 based on the automatic control rules that are pre-stored in the remote controller 30. The remote controller 30 acquires the state of the air conditioner 40 via the network 20. The state includes the operation content of the air conditioner 40, as well as humidity and temperature information acquired by temperature and humidity sensors provided in the air conditioner 40. If the remote controller 30 and air conditioner 40 are installed at the same location, the temperature and humidity sensors can be provided in the remote controller 30.

The remote controller 30 compares the acquired state of the air conditioner 40 with the automatic control rules. If the state of the air conditioner 40 and automatic control rules match, the remote controller 30 automatically controls the air conditioner 40. For example, if there is an automatic control rule where "the acquired temperature information is equal to or higher than a given temperature", and the temperature information acquired by the temperature sensor is equal to or higher than the given temperature, the remote controller 30 automatically controls the air conditioner 40, for example, turning on the air conditioner 40 in the air-conditioning mode, according to the air conditioner control content predetermined for controlling the air conditioner 40 which complies with the automatic control rules.

The resident can also change (or, hereinafter referred to as "adjust") the automatic control rules by operating the remote controller 30. The remote controller 30 stores information regarding whether or not to permit adjustment of the automatic control rules in advance. When detecting an operation to adjust the automatic control rules (adjustment operation), the remote controller 30 makes reference to the information regarding whether or not to permit adjustment of the automatic control rules. If the adjustment is permitted, the remote controller 30 creates a rule adjustment screen as an operation screen for the resident to adjust the automatic control rules and displays the rule adjustment screen on a display device provided on the remote controller 30. The resident can conduct operation on the displayed rule adjustment screen (for example, a touch panel operation) to adjust the automatic control rules. When any adjustment is made in the automatic control rules, the remote controller 30 automatically controls the air conditioner 40 according to the adjusted automatic control rules.

The automatic control rules and information regarding whether or not to permit adjustment of the automatic control rules are stored in the remote controller 30 in advance by an operator using a terminal 50, which has been connected to the remote controller 30 by the operator. The resident can adjust the automatic control rules within a range permitted by the operator.

The content of the air conditioner control device 10 will be described hereafter.

As shown in FIG. 1, the remote controller 30 is functionally composed of: an air-conditioning information memory 101; a system communication means 102; an air conditioner operation means 103; an air conditioner automatic control means 104; an automatic control rule memory 105; a rule adjustment screen memory 106; a rule adjustment screen generation means 107; and a rule adjustment operation means 108.

The remote controller 30 is physically composed of: a CPU (central processing unit); a ROM (read only memory) storing operation programs; a RAM (read only memory) as a temporary storage region during operation; a user interface for operation by the resident; and a communication interface for connecting to the network 20; and terminal 50.

The air conditioner control device 10 of the present invention can be configured only with the remote controller 30.

The terminal 50 is functionally composed of a control rule input means 109 and an adjustment permission information input means 110. Both the control rule input means 109 and the adjustment permission information input means 110 serve as an interface for the operator to enter information for controlling the air conditioner 40. The control rule input means 109 and adjustment permission information input means 110 send a control signal corresponding to the input content to the remote controller 30.

The control rule input means 109 is an interface for entering rules for automatically controlling the operation of the air conditioner 40 into the automatic control rule memory 105 of the remote controller 30. The adjustment permission information input means 110 is an interface for entering information defining whether to permit or prohibit the adjustment of the rules stored in the automatic control rule memory 105 for automatically controlling the operation of the air conditioner 40 through the rule adjustment operation means 108. Using the rule adjustment operation means 108, the resident can adjust only the automatic control rules of which adjustment is permitted via the adjustment permission information input means 110.

FIG. 2 is a diagram showing an example of the air-conditioning information according to Embodiment 1. The air-conditioning information memory 101 stores the state of each air conditioner 40 (the temperature and humidity around the air conditioner and set operation content etc.) in the form of air-conditioning information 1011 shown in FIG. 2. The air-conditioning information 1011 is information for controlling an air conditioner 40, and consists of air-conditioning information numbers for identifying the information, addresses indicating the stored location in the air-conditioning information memory 101, data sizes, and values indicating the state of the air conditioner 40.

In FIG. 2, data having an air-conditioning information number "1" indicates the temperature around the air conditioner 40 (27° C. in this example). Data having an air-conditioning information number "2" indicates the humidity around the air conditioner 40 (80% in this example). Data having an air-conditioning information number "3" indicates the operation mode set for the air conditioner 40 (the "off" mode corresponding to a value "0" in this example). Data having an air-conditioning information number "4" indicates the air flow set for the air conditioner 40 (an air flow "high" corresponding to a value "2" in this example). In the example of FIG. 2, data having the air-conditioning information numbers "1" and "2" are environmental information regarding the air conditioner 40 and input information to be entered into the remote controller 30. On the other hand, data having the air-conditioning information numbers "3" and "4" can be input information or output information output to the air conditioner 40 from the remote controller 30 for controlling the air conditioner 40. In any case, this data is information indicating the operation of the air conditioner 40.

FIG. 2 shows examples of the air-conditioning information 1011. The air-conditioning information 1011 is not confined to this example. For example, the air-conditioning information 1011 has an air-conditioning information number for mutual distinction. The numbers can be replaced by names or codes expressly indicating the meaning of the information. In the following explanation, the term "air-conditioning information number" is used in this broad sense.

The system communication means 102 comprises an interface for connecting to the wired/wireless network 20 to which the air conditioner 40 is connected. The system communication means 102 receives a control signal indicating the state of the air conditioner 40 from the network 20 and updates the content of the air-conditioning information memory 101. The information from this control signal is input information. Furthermore, the system communication means 102 sends a control signal for the air conditioner 40 to the network 20 based on a change in the content of the air-conditioning information memory 101 as a result of the update. The information from this control signal is output information.

The air conditioner operation means 103 receives an operation from the resident and changes the content of the air-conditioning information memory 101 according to the operation content. The air conditioner operation means 103 is a user interface for the user (resident) to manually manipulate the settings of the air conditioner 40 (temperature setting, humidity setting, operation mode, air flow, and/or the like).

The air conditioner automatic control means 104 determines the control content for automatically controlling the air conditioner 40 based on the content of the automatic control rule memory 105 and changes the content of the air-conditioning information memory 101. The changed content corresponds to output information and the system communication means 102 sends a control signal for the air conditioner 40 to the network 20 based on the change in the content of the air-conditioning information memory 101. The air conditioner 40 is automatically controlled based on the control signal.

The automatic control rule memory 105 stores at least one rule for the air conditioner automatic control means 104 which automatically controls the air conditioner 40, in each form of the input determination formula 1051, output-setting formula 1052, input/output connection formula 1053, and input/output execution information 1054, shown in FIGS. 3 to 6.

FIG. 3 is a diagram showing examples of the input determination formula 1051 according to Embodiment 1. The input determination formula 1051 indicates a rule to determine a state of the input information in the air-conditioning information 1011 with respect to a given criterion value. An input determination formula 1051 consists of an input number 1051$a$ for identifying the input determination formula 1051, an input information number 1051$b$ that expresses the formula itself, an operator 1051$c$, and an input evaluation value 1051$d$. The input information number 1051$b$ presents the air-conditioning information number in the air-conditioning information memory 101. The input information number 1051$b$ is used to make reference to the value of input information in the field "value" under the corresponding air-conditioning information number in the air-conditioning information memory 101. The operator 1051$c$ is an operator used in comparing the value of input information referred to by the input information number 1051$b$ with the input evaluation value 1051$d$. In the case where no comparison is being made, no operator 1051$c$ is given (default). The input evaluation value 1051$d$ is the criterion value to be compared with the value of input information in the determination formula.

The air conditioner automatic control means 104 reads an input determination formula 1051 from the automatic control rule memory 105. Then, the air conditioner automatic control means 104 acquires the value of input information corresponding to the input information number 1051$b$ of the input determination formula 1051 from the air-conditioning information 1011, enters the value of input information into the input determination formula 1051, and determines whether or not the input determination formula 1051 is satisfied. When the operator 1051$c$ is a default, the input information is determined to satisfy the input determination formula.

FIG. 4 is a diagram showing examples of the output-setting formula 1052 according to Embodiment 1. The output-setting formula 1052 is used to set information output to the air conditioner 40 via the system communication means 102 (output information) in the air-conditioning information memory 101. An output-setting formula 1052 consists of an output number 1052a for identifying the output-setting formula, an output information number 1052b that expresses the setting formula itself, and an output-setting value 1052c. The output information number 1052b presents the air-conditioning information number in the air-conditioning information memory 101. The output-setting value 1052c presents a value to be stored in the field "value" under the corresponding air-conditioning information number in the air-conditioning information 1011 as output information.

The air conditioner automatic control means 104 stores the value of the output-setting value 1052c at a given address in the air-conditioning information memory 101 according to a given output-setting formula 1052 when the input information satisfies the input determination formula 1051. The given output-setting formula is the one associated with (which is referred to as "connecting") the input determination formula 1051 by means of an input/output connection formula 1053 described hereinafter.

Figure 5:
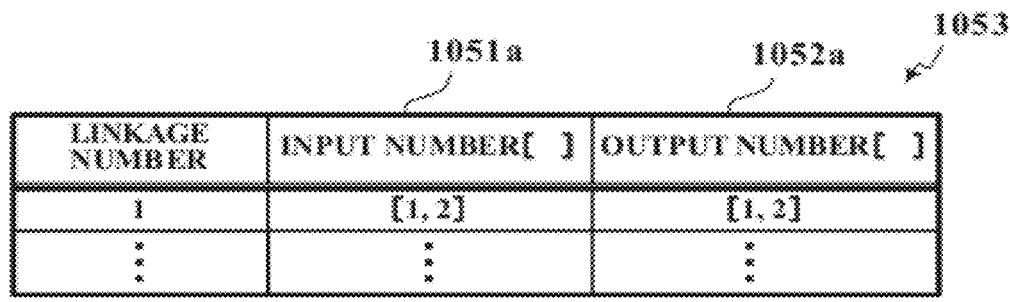
FIG. 5 shows an example of the input/output connection formula according to Embodiment 1.

FIG. 5 is a diagram showing an example of the input/output connection formula 1053 according to Embodiment 1. The input/output connection formula 1053 presents association between input determination formula 1051 and output connection formula 1052. An input/output connection formula 1053 consists of a linkage number for identifying the input/output connection formula, the input number 1051a of at least one input determination formula 1051, and the output number 1052a of at least one output-setting formula 1052. The input/output connection formula 1053 defines the output-setting formula 1052 indicated by the output number 1052a to be executed when the input determination formula 1051 indicated by the input number 1051a is satisfied.

Figure 6:
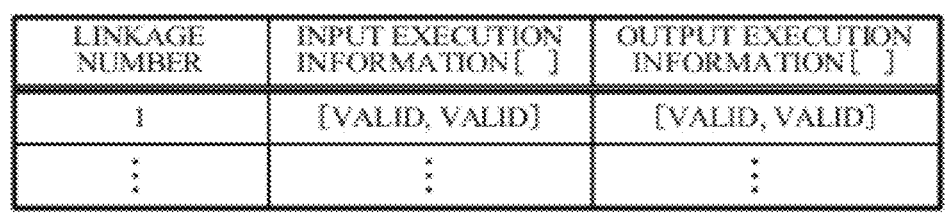
FIG. 6 shows an example of the input/output execution information according to Embodiment 1.

FIG. 6 is a diagram showing an example of the input/output execution information 1054 according to Embodiment 1. The input/output execution information 1054 consists of input execution information and output execution information defining "valid" or "invalid" for each of the input number 1051a and output number 1052a contained in the input/output connection formula 1053 as being." The air conditioner automatic control means 104 determines whether the input determination formula 1051 corresponding to the valid input number 1051a in the input execution information of the input/output execution information 1054 is satisfied or not.

When an input number 1051a is valid and the input determination formula 1051 corresponding to the input number 1051a is satisfied, or when plural input numbers 1051a are valid and the input determination formulae 1051 corresponding to all of the valid input numbers 1051a are satisfied, the air conditioner automatic control means 104 updates the value stored at the corresponding address in the air-conditioning information 1011 with the value set in the output-setting formula 1052 corresponding to the output number 1052a that is valid in the output execution information of the input/output execution information 1054. The corresponding address is the address determined by the air-conditioning information number of the air-conditioning information 1011 corresponding to the output information number 1052b of the output-setting formula 1052.

FIGS. 3 to 6 show examples of the input determination formula 1051, output-setting formula 1052, input/output connection formula 1053, and input/output execution information 1054. The contents of the input determination formula 1051, output-setting formula 1052, input/output connection formula 1053, and input/output execution information 1054 are not confined to the examples illustrated.

The rule adjustment screen generation means 107 has attribute definition information 1071, icon definition information 1072, control value adjustment permission information 1073, and execution adjustment permission information 1074. The rule adjustment screen generation means 107 generates a rule adjustment screen to be displayed to the resident for adjusting the rules in the form of, for example, adjustment screen information 1061 (see FIG. 2) that indicates information regarding the elements configuring the rule adjustment screen based on the above information and information stored in the automatic control rule memory 105, and stores the rule adjustment screen in the rule adjustment screen memory 106.

Figure 7:
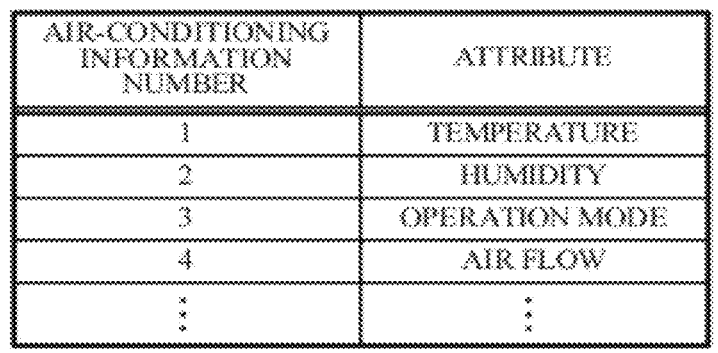
FIG. 7 shows an example of the attribute definition information according to Embodiment 1.

FIG. 7 is a diagram showing an example of the attribute definition information 1071 according to Embodiment 1. The attribute definition information 1071 indicates type information of the attribute that the air-conditioning information 1011 stored in the air-conditioning information memory 101 has. The attribute definition information 1071 consists of the air-conditioning information number of the air-conditioning information 1011 stored in the air-conditioning information memory 101 and the attribute defined for the air-conditioning information 1011. In the example of FIG. 7, the attribute is temperature, humidity, operation mode, air flow, or the like.

Figures 8, 9:
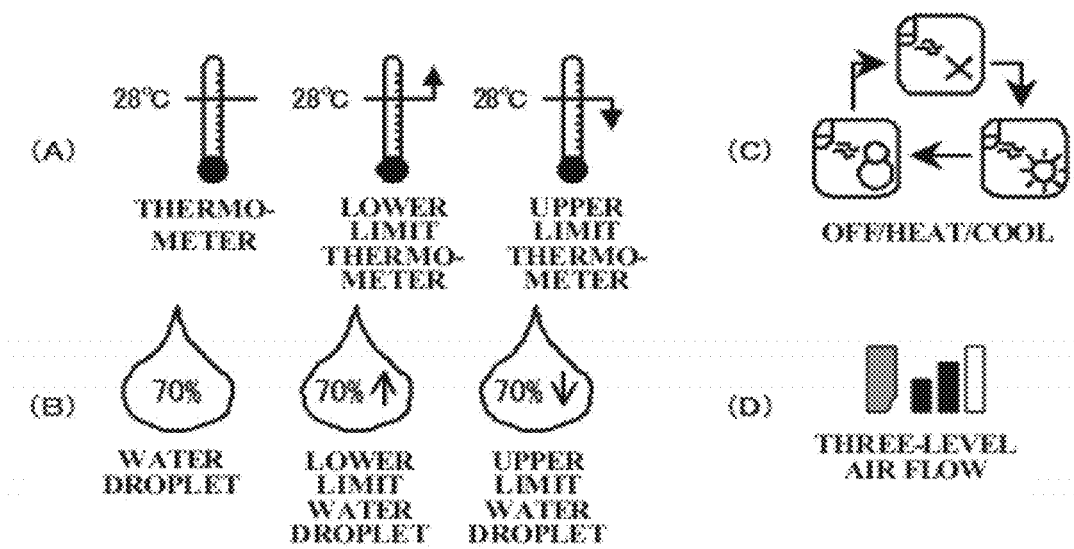
FIG. 8 shows an example of the icon definition information according to Embodiment 1.
FIG. 9 shows exemplary icons defined by the icon definition information according to Embodiment 1.

FIG. 8 is a diagram showing an example of the icon definition information 1072 according to Embodiment 1. The icon definition information 1072 defines the icons indicating the contents of the input determination formula 1051 and output-setting formula 1052 respectively. The icon definition information 1072 consists of the input/output attribute presented in the attribute definition information 1071, the operator presented in the operator 1051c in the case of input, and the corresponding icon. An icon corresponding to input is termed an input icon, an icon corresponding to output is termed an output icon, and collectively an icon is termed an input/output icon. The input/output icon defined in the icon definition information 1072 is used on the rule adjustment screen by the resident to adjust the content of the automatic control rule memory 105. The input/output icon is defined on the basis of an attribute (operation mode, air flow, or the like) when there is no operator (including a default) such as one for output, and defined on the basis of combination of an attribute (temperature, humidity, or the like) and an operator when there is an operator.

The input/output icons shown in FIG. 8 are represented by a notation. However, a graphic icon which corresponds to the notation is used for displaying on a display device. FIG. 9 is a diagram showing examples of the icons defined by the icon definition information according to Embodiment 1. FIG. 9 (A) to (D) show specific examples of the icons in FIG. 8. FIGS. 9 (A) and (B) show exemplary input icons corresponding to the combinations of an attribute "temperature" and operator 1051c (including default) and the combinations of an attribute "humidity" and operator 1051c (including default), respectively. FIG. 9 (C) shows an exemplary output icon corresponding to an attribute "operation mode." FIG. 9 (D) shows an exemplary output icon corresponding to an attribute "air flow."

Apart from FIG. 8, an execution adjustment icon indicating that the input determination formula 1051 and output-setting formula 1052 contained in the input/output connection formula 1053 are valid/invalid (input execution information and output execution information (input/output execution information 1054)) is also defined. The execution adjustment icon is a fixed icon common to all input/output information regardless of the input/output attribute or operator 1051c. Therefore, two icons are assigned to the input determination formula 1051 and output-setting formula 1052: an input/output icon indicating the content (input/output attribute, operator, or the like) of each formula (exemplified in FIG. 9) and an execution adjustment icon indicating the input/output execution information 1054 regardless of the input/output content. A specific example of the execution adjustment icon will be described hereinafter.

FIG. 10 is a diagram showing an example of the control value adjustment permission information 1073 according to Embodiment 1. The control value adjustment permission information 1073 indicates whether or not to permit adjustment of the control value for each of the input numbers 1051*a* of the input determination formula 1051 and the output numbers 1052*a* of the output-setting formula 1052 contained in the input/output connection formula 1053. The control value refers to the input evaluation value 1051*d* and output-setting value 1052*c*. The control value adjustment permission information 1073 consists of an input/output classifier for identifying which is the target of permission, an input determination formula 1051 or an output-setting formula 1052 contained in the input/output connection formula, and an input/output number indicating either one of an input number 1051*a* of the input determination formula 1051 or an output number 1052*a* of the output-setting formula 1052 for further confining the target of permission for adjustment. This control value adjustment permission information 1073 indicates that the resident can adjust the input evaluation value 1051*d* of the input determination formula 1051 or the output-setting value 1052*c* of the output-setting formula 1052 (namely, the control value) under the input number 1051*a* or the output number 1052*a* corresponding to the registered input/output number.

FIG. 11 is a diagram showing an example of the execution adjustment permission information 1074 according to Embodiment 1. The execution adjustment permission information 1074 determines in advance whether or not to permit adjustment of the valid/invalid set in the input/output execution information 1054 in accordance with the input/output connection formula 1053. The execution adjustment permission information 1074 consists of a linkage number of the input/output connection formula 1053 to permit adjustment, an input/output classifier for identifying which is the target of permission for adjustment of the valid/invalid, an input determination formula 1051 or an output-setting formula 1052, and input/output number indicating the input number 1051*a* of the input determination formula 1051 or the output number 1052*a* of the output-setting formula 1052. This execution adjustment permission information 1074 indicates that the resident can adjust the input/output execution information 1054 corresponding to the input/output number of the formula corresponding to the input/output classifier (either an input determination formula 1051 or an output-setting formula 1052) in the input/output connection formula 1053 having the linkage number registered therein.

For example, in the example of the execution adjustment permission information 1074 shown in FIG. 11, the input numbers "1" and "2" are registered under a linkage number "1." Therefore, the FIG. 11 indicates that the resident can adjust two portions of input execution information under the linkage number "1" in the input/output execution information 1054 shown in FIG. 6.

FIGS. 7 to 11 show examples of the attribute definition information 1071, icon definition information 1072, icons, control value adjustment permission information 1073, and execution adjustment permission information 1074, and these portions of information are not confined to the examples shown in FIGS. 7 to 11.

FIG. 12 is a diagram showing an example of the adjustment screen information 1061 according to Embodiment 1. The rule adjustment screen memory 106 stores an adjustment screen (rule adjustment screen) in the form of the adjustment screen information 1061. The rule adjustment screen is a screen to be displayed on a display device for the resident to adjust the rules when the resident adjust the rules stored in the automatic control rule memory 105. The adjustment screen information 1061 is information regarding a screen for adjusting the input determination formula 1051, the output-setting formula 1052, and the input/output execution information 1054, which are stored in the automatic control rule memory 105, and is organized on the basis of the input/output connection formula 1053.

As shown in FIG. 12, the adjustment screen information 1061 contains information such as the linkage number, the input/output classifier, the input/output number, the icon, the control value, the control value adjustment permission, the execution information, and the execution adjustment permission.

The linkage number is the linkage number of the input/output connection formula 1053 that is the target of rule adjustment. The input/output classifier indicates "input" or "output" and accordingly classifies the target of rule adjustment as regarding an input determination formula 1051 or as regarding an output-setting formula 1052. The input/output number is the input number 1051*a* of the input determination formula 1051 or the output number 1052*a* of the output-setting formula 1052, specifying the target of rule adjustment.

The icon is an input/output icon defined in the icon definition information 1072. The execution adjustment icon is a fixed icon regardless of the input/output content. It is sufficient that the adjustment screen information 1061 has a description of the input/output execution information. Therefore, the adjustment screen information 1061 does not include the execution adjustment icon.

The control value is the direct target of rule adjustment. If the target of rule adjustment is an input determination formula 1051, the input evaluation value 1051*d* is the control value. If the target of rule adjustment is an output-setting formula 1052, the output-setting value 1052*c* is the control value.

The control value adjustment permission indicates that adjustment of the control value is "permitted" or "prohibited." Whether or not the icon display state of the input/output information can be changed by a user operation depends on whether or not this control value adjustment permission is permitted or prohibited.

The execution information is the input execution information or output execution information in the input/output execution information 1054 for the corresponding input determination formula 1051 or output-setting formula 1052 in the input/output connection formula 1053, and indicates "valid" or "invalid" regarding to input determination formula 1051 or output-setting formula 1052.

The execution adjustment permission indicates that adjustment of the valid/invalid of the input execution information or output execution information is "permitted" or "prohibited." Whether or not the execution adjustment icon display state can be changed by user operation depends on whether or not this execution adjustment permission is permitted or prohibited.

The rule adjustment screen generation means 107 generates a rule adjustment screen in the form of the adjustment screen information 1061 and stores the adjustment screen information 1061 in the rule adjustment screen memory 106.

FIG. 12 shows an example of the adjustment screen information 1061, and the adjustment screen information 1061 is not to be limited to the example shown in FIG. 12.

The rule adjustment operation means 108 creates an adjustment screen from the content (the adjustment screen information 1061) of the rule adjustment screen memory 106, displays the adjustment screen on the display device of the rule adjustment operation means 108 of the remote controller 30 (for example, an liquid crystal display with a touch panel), and receives an operation to adjust the content of the automatic control rule memory 105 from the resident. The rule adjustment operation means 108 is a user interface for the resident or the user to adjust the automatic control settings of the air conditioner 40.

(Outline of Operation of the Air Conditioner Control Device 10)

FIGS. 13 to 16 are flowcharts showing operation of the air conditioner control device 10 according to Embodiment 1 of the present invention. Operation of the air conditioner control device 10 will be described hereinafter with reference to FIGS. 13 to 16.

Operation of the air conditioner control device 10 according to Embodiment 1 is divided into the following three major steps S1 to S3.

(Step S1) Air Conditioner Automatic Control Procedure

The air conditioner automatic control procedure is executed when the air conditioner control device 10 is in normal operation (when no operation is conducted on the air conditioner control device 10 to adjust the rules of the air conditioner 40).

In the air conditioner automatic control procedure, the system communication means 102 of the remote controller 30 acquires and analyzes a control signal, travelling through the network 20, which indicates the state of the air conditioner 40, and stores analysis results in the air-conditioning information memory 101. On the other hand, the air conditioner operation means 103 updates the values in the air-conditioning information memory 101 based on the operation content received from the resident. Furthermore, the air conditioner automatic control means 104 determines a control content based on the content stored in the automatic control rule memory 105 using the values stored in the air-conditioning information memory 101 as parameters, and updates the values in the air-conditioning information memory 101. Then, the system communication means 102 sends a control signal for controlling the air conditioner 40 connected to the network 20 based on the values in the updated air-conditioning information memory 101.

(Step S2) Adjustment Screen Generation/Display Procedure

The adjustment screen generation/display procedure is divided into an adjustment screen generation procedure to generate adjustment screen information 1061 and store the adjustment screen information 1061 in the rule adjustment screen memory 106, and an adjustment screen display procedure to display a rule adjustment screen on a display device based on the adjustment screen information 1061 stored in the rule adjustment screen memory 106.

In the adjustment screen generation procedure, the rule adjustment screen generation means 107 extracts an input and output icon for control from the control content stored in the automatic control rule memory 105, corresponding air-conditioning information 1011, and the operator 1051c for evaluating the input using the attribute definition information 1071 and icon definition information 1072 to generate adjustment screen information 1061, and store the adjustment screen information 1061 in the rule adjustment screen memory 106. This procedure is executed after some rule is adjusted based on the changed rules. The expression "after some rule is adjusted" means after the resident adjust some rule via the rule adjustment operation means 108 and the content of the automatic control rule memory is changed.

In the adjustment screen display procedure, the rule adjustment operation means 108 creates a rule adjustment screen based on the adjustment screen information 1061 stored in the rule adjustment screen memory 106 and displays the rule adjustment screen on a display device. This procedure is executed when some rule is to be adjusted. The expression "when some rule is to be adjusted" means when the resident conduct input operation to start adjustment of the rules via the rule adjustment operation means 108.

(Step S3) Control Rules Adjustment Procedure

The control rules adjustment procedure is a procedure to adjust the content of the automatic control rule memory via the rule adjustment screen. The control rules adjustment procedure starts when the air conditioner control device 10 receives specific rule adjustment operation at the rule adjustment operation means 108.

The rule adjustment operation means 108 creates a rule adjustment screen based on the adjustment screen information 1061 stored in the rule adjustment screen memory 106 and displays the rule adjustment screen on a display device in the Step S2. In Step S3, the resident manipulates the rule adjustment screen displayed in the Step S2 to adjust the control content stored in the automatic control rule memory 105.

The operation programs of the above steps S1 to S3 are stored in the ROM of the remote controller 30. The CPU reads the operation programs for execution.

The content of the Steps S1 to S3 will be described hereafter along with the specific function and operation of the parts.

(Outline of Operation in Air Conditioner Automatic Control Procedure (Step S1))

FIG. 13 is a flowchart showing the content of the air conditioner automatic control procedure (Step S1). The steps in FIG. 13 will be described hereinafter.

In the air conditioner automatic control procedure, the system communication means 102 first determines whether or not the control signal indicating the state of the air conditioner 40 is received from the network 20 (Step D1). If the control signal indicating the state of the air conditioner 40 is received (Step D1; YES), the system communication means 102 analyzes the signal. If the results of the analysis show that there are plural transmission source air conditioners 40, a transmission source device for identifying the transmission source air conditioner 40, an information classifier of the signal, and the value of the information are extracted as a set and stored at a corresponding location in the air-conditioning information memory 101 as air-conditioning information 1011, so as to update the air-conditioning information memory 101 (Step S101). Then, the process continues to Step D3.

It is possible that the signal is a packet signal and the transmission source device, information classifier, and the value are determined based on the value stored at a specific byte position. Alternatively, it is also possible that the signal is a digital signal that merely indicates an ON/OFF mode, that the value is an ON/OFF value thereof and that the transmission source device and the information classifier are determined based on the port number at which the control signal is received.

If no control signal indicating the state of the air conditioner 40 is received (Step D1; NO), the air conditioner operation means 103 determines whether or not there is any operation on the air conditioner operation means 103 (Step D2). If there is any operation (Step D2; YES), the air conditioner operation means 103 extracts an operation target air conditioner 40, an information classifier, and the value of the information classifier as a set and stores them at corresponding locations in the air-conditioning information memory 101 as air-conditioning information 1011, so as to update the air-conditioning information memory 101 (Step S102). Then, the process continues to Step D3. If there is no operation in the air conditioner operation means 103 (Step D2; NO), this process returns to Step D1.

The above operation can be an operation that changes the set temperature or an operation that changes the air direction. The value can be a value defining the new state of the changed information.

Next, the air conditioner automatic control means 104 determines whether or not the air-conditioning information number of the updated information (updated value) in the air-conditioning information memory 101 is found in any input determination formula 1051 (Step D3). In other words, this determination means to determine whether or not the updated value is information defined as an input of any input determination formula 1051 stored in the automatic control rule memory 105. The determination is conducted by examining whether or not the air-conditioning information number of the updated air-conditioning information 1011 in the air-conditioning information memory 101 is equal to the input information number 1051b of any input determination formula 1051 in the automatic control rule memory 105.

If the updated information is information defined as an input of any input determination formula 1051 stored in the automatic control rule memory 105 (Step D3; YES), the air conditioner automatic control means 104 enters the value of the updated information corresponding to the input information number 1051b of the input determination formula 1051 into the input determination formula 1051 as the comparison target of the input determination formula 1051 (Step S103). If the air-conditioning information number of the updated value is not found in any input determination formula, in other words if the updated value is not information defined as an input of any input determination formula 1051 stored in the automatic control rule memory 105 (Step D3; NO), the process returns to the processing of Step D1.

If a value is entered, the air conditioner automatic control means 104 invokes a function corresponding to the operator 1051c of the input determination formula 1051 with the entered value and input evaluation value 1051d as an argument and determines whether or not the input determination formula 1051 is satisfied ("verified") or unsatisfied ("unverified") (Step S104).

The air conditioner automatic control means 104 reads from the automatic control rule memory 105 an input/output connection formula 1053 having the targeted input determination formula 1051 as an input number 1051a and the input/output execution information 1054 corresponding to the input/output connection formula 1053 and enters the obtained results ("verified"/"unverified") into the field corresponding to the input number 1051a of the input/output connection formula 1053. In such a case, on the input determination formula 1051 for which "invalid" is set in the input execution information of input/output execution information 1054, the air conditioner automatic control means 104 enters "verified" in the field of the corresponding input number 1051a in the input/output connection formula 1053, regarding that the input determination formula 1051 is unconditionally verified.

If there are plural inputs, the logical product of the inputs is entered in the field corresponding to the input number 1051a of the input/output connection formula 1053. Moreover, once the obtained result is "verified," the output-setting formula 1052 corresponding to the output number 1052a of the input/output connection formula 1053 validating the output execution information of the input/output execution information 1054, is thereby determined as the output setting formula 1052 to be executed (Step S105).

The air conditioner automatic control means 104 sets and stores the value of the output-setting value 1052c according to the input using the output-setting formula 1052 at a given location (address) in the air-conditioning information memory 101 (Step S106).

The system communication means 102 determines whether or not the value stored in the Step S106 is a value relating to the control of the air conditioner 40 (Step D4). This determination is conducted by pre-registering an output-setting formula 1052 relating to the control of the air conditioner 40 and checking the value of the output-setting value 1052c with this registered information. If the set value of the output-setting value 1052c relates to the control of the air conditioner 40 (Step D4; YES), a control signal for controlling the air conditioner 40 is generated in accordance with the value stored in the Step S106, and sent to the air conditioner 40 connected to the network 20. Afterwards, the process returns to the processing of Step D1 (Step S107). If the set value does not relate to the control of the air conditioner 40 (Step D4, NO), the process immediately returns to the processing of Step D1.

(Outline of Operation in Adjustment Screen Generation/Display Procedure (Step S2))

Figure 15:
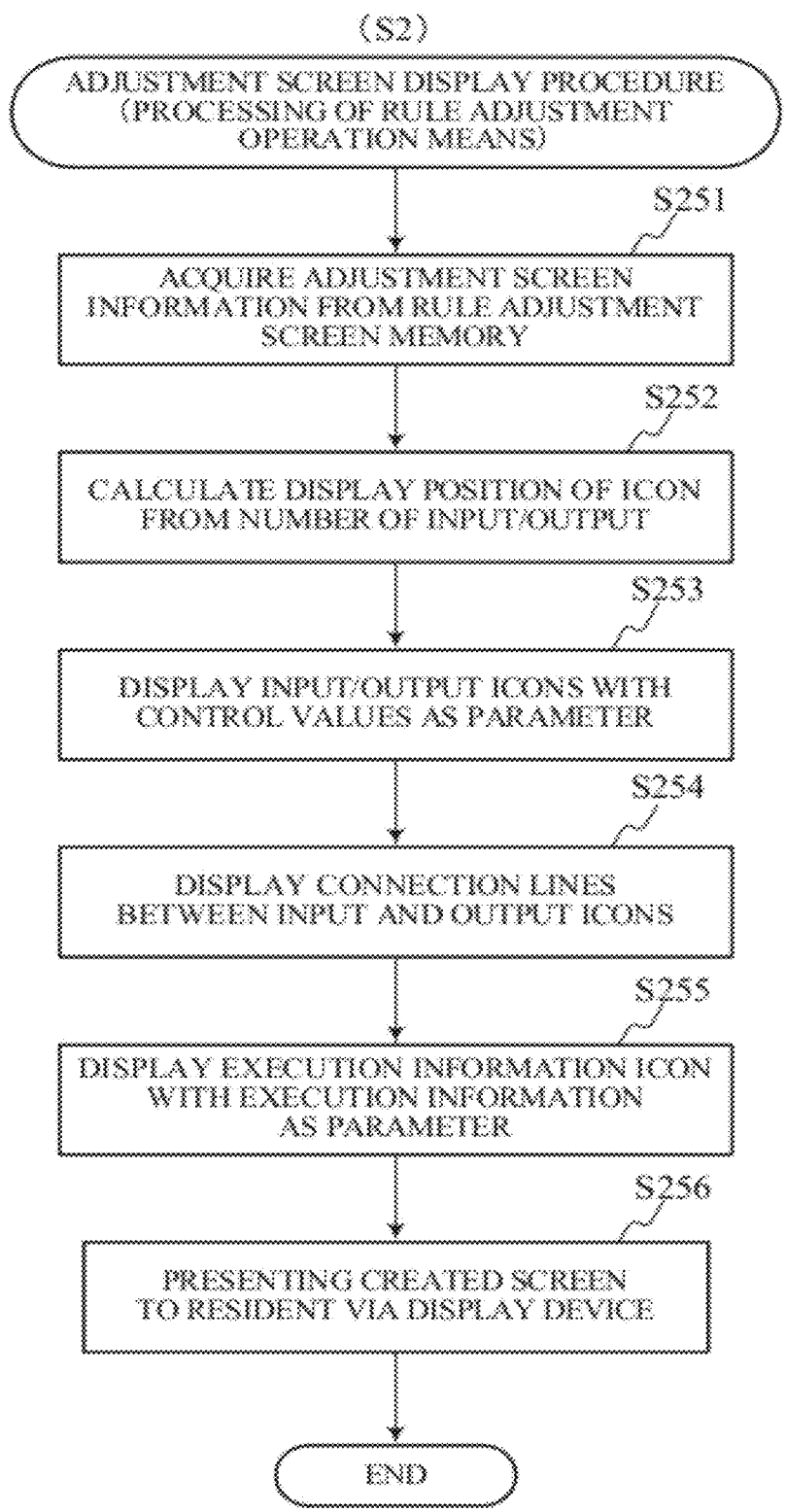
FIG. 15 is a flowchart showing the content of the adjustment screen display procedure according to Embodiment 1.

The adjustment screen generation/display procedure (Step S2) is largely divided into an adjustment screen generation procedure and an adjustment screen display procedure. FIG. 14 is a flowchart showing the content of the adjustment screen generation procedure according to Embodiment 1. FIG. 15 is a flowchart showing the content of the adjustment screen display procedure according to Embodiment 1.

The procedure shown in FIG. 14 is a procedure of Steps S201 to S208 in which the rule adjustment screen generation means 107 generates adjustment screen information 1061 based on the control content stored in the automatic control rule memory 105 and stores the adjustment screen information 1061 in the rule adjustment screen memory 106. The procedure shown in FIG. 15 is a procedure of Steps S251 to S256 in which the rule adjustment operation means 108 displays a rule adjustment screen on a display device based on the adjustment screen information 1061 stored in the rule adjustment screen memory 106.

The adjustment screen generation procedure performed by the rule adjustment screen generation means 107 will be described with reference to FIG. 14.

When some automatic control rule is changed through the rule adjustment operation means 108 among the control content stored in the automatic control rule memory 105, the rule adjustment screen generation means 107 first acquires all input/output connection formulae 1053 from the automatic control rule memory 105 (Step S201).

The following Steps S202 to S206 are executed for all input determination formulae 1051 and output-setting formulae 1052 contained in the acquired input/output connection formulae 1053.

Then, the rule adjustment screen generation means 107 acquires a targeted input determination formula 1051 or output-setting formula 1052 contained in the input/output connection formula 1053 from the automatic control rule memory 105 (Step S202).

In the case of an input determination formula 1051 (Step D5; Input), the rule adjustment screen generation means 107 acquires an attribute of the air-conditioning information 1011 referred to by the input information number 1051b from the attribute definition information 1071 (Step S203a), and proceeds to Step S204a. In the case of an output-setting formula 1052 (Step D5; Output), the rule adjustment screen generation means 107 acquires the attribute of the air-conditioning information 1011 referred to by the output information number 1052b from the attribute definition information 1071 (Step S203b), and proceeds to Step S204b.

In the Step S204a, the rule adjustment screen generation means 107 makes reference to the icon definition information 1072 and acquires an input icon corresponding to a combination between the attribute of the air-conditioning information 1011 referred to by the input information number 1051b and the operator 1051c (Step S204a).

In the Step S204b, the rule adjustment screen generation means 107 makes reference to the icon definition information 1072 and acquires an output icon corresponding to the attribute of the air-conditioning information 1011 referred to by the output information number 1052b (Step S204b).

Following the processing of Step S204a or S204b, the rule adjustment screen generation means 107 makes reference to the control value adjustment permission information 1073, determines whether or not the targeted input determination formula 1051 or output-setting formula 1052 is contained in the control value adjustment permission information 1073. The rule adjustment screen generation means 107 determines information regarding control value adjustment permission permitting adjustment of the control value if the targeted input determination formula 1051 or output-setting formula 1052 is contained or prohibiting adjustment of the control value if the targeted input determination formula 1051 or output-setting formula 1052 is not contained (Step S205).

Next, the rule adjustment screen generation means 107 acquires the input/output execution information 1054 from the automatic control rule memory 105 and determines the input/output execution information corresponding to the input determination formula 1051 or output-setting formula 1052 of the targeted input/output connection formula 1053 to be valid or invalid (Step S206).

Then, the rule adjustment screen generation means 107 makes reference to the execution adjustment permission information 1074 and determines whether or not the targeted input determination formula 1051 or output-setting formula 1052 is contained in the execution adjustment permission information 1074. The rule adjustment screen generation means 107 determines information regarding execution adjustment permission permitting adjustment of the execution information if the targeted input determination formula 1051 or output-setting formula 1052 is contained or prohibiting adjustment of the execution information if the targeted input determination formula 1051 or output-setting formula 1052 is not contained (Step S207).

The rule adjustment screen generation means 107 stores the linkage number of the input/output connection formula 1053 acquired in the Step S201, the input number 1051a of the input determination formula 1051 or output number 1052a of the output-setting formula 1052 acquired in the Step S202, the control value (the input evaluation value or output-setting value) acquired in the Step S202, the input/output icon acquired in the Step S204a or 204b, the determination result of information regarding control value adjustment permission that permits or prohibits adjustment of the control value in the Step S205, the input/output execution information regarding "valid" or "invalid" determined in the Step S206, and the determination result of information regarding execution adjustment permission that permits or prohibits adjustment of the execution information in the Step S207 as a set of adjustment screen information 1061 in the rule adjustment screen memory 106 (Step S208).

The adjustment screen display procedure performed by the rule adjustment operation means 108 will be described hereafter with reference to FIG. 15. This procedure starts when the resident conducts a given input operation as an indication of his/her intention to start a rule adjustment input through the rule adjustment operation means 108.

First, the rule adjustment operation means 108 acquires the adjustment screen information 1061 from the rule adjustment screen memory 106 (Step S251).

The following Steps S252 to S256 are executed for each linkage number in the acquired adjustment screen information 1061.

The rule adjustment operation means 108 calculates the display positions on the adjustment screen of input icons for adjusting the input determination formula 1051 and output icons for adjusting the output-setting formula 1052 from the number of inputs/outputs contained in the targeted linkage number in the adjustment screen information 1061 (Step S252). For example, the positions are calculated so that the input icons are arranged from the top left to bottom left and the output icons are arranged from the top right to bottom right on the screen.

Subsequently, the rule adjustment operation means 108 displays the input and output icons with the control values as the parameters at the calculated positions (Step S253).

The rule adjustment operation means 108 connects the input icons and output icons with lines (Step S254). Accordingly, each icon may be expressed as a single rule of the same linkage number.

The rule adjustment operation means 108 displays an execution adjustment icon with the execution information as an argument to the right of the input icon if the content of the execution adjustment permission corresponding to the input number 1051a is "permitted" and to the left of the output icon if the content of the execution adjustment permission corresponding to the output number 1052a is "permitted" in the FIG. 12 (Step S255). If the execution adjustment permission information is "prohibited," the execution adjustment icon is not displayed. "To display with the execution information as an argument" means to display in a manner where "valid/invalid" execution information is shown.

Finally, the created image is output to a display device of the remote controller 30 (Step S256).

The Step S2 is applicable not only to the above-described case in which the control rules stored in the automatic control rule memory 105 are adjusted through the rule adjustment operation means 108, but also to the case in which control rules are entered via the control rule input means 109 and stored in the automatic control rule memory 105.

(Outline of Operation in Control Rule Adjustment Procedure (Step S3))

Figure 16:
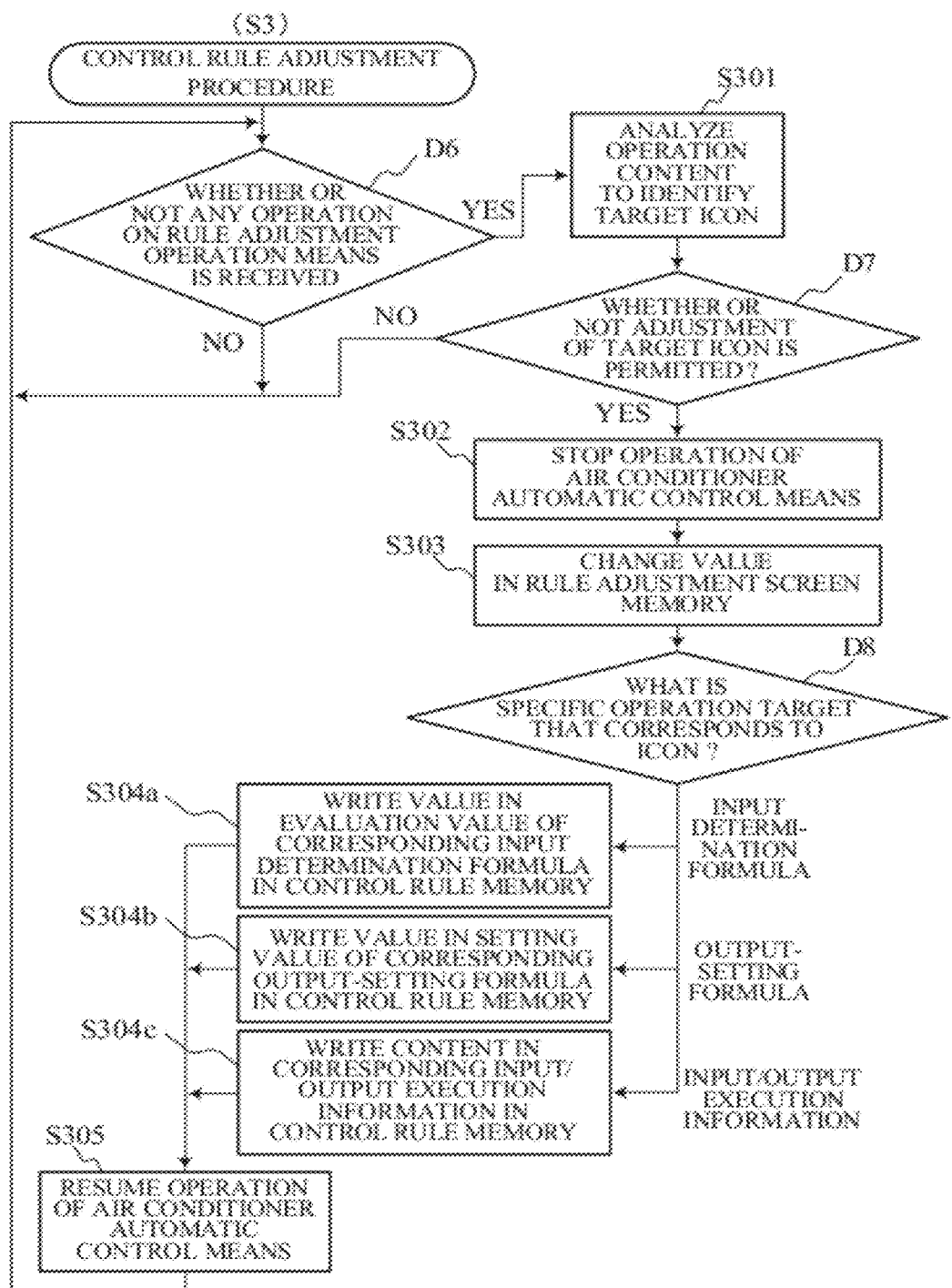
FIG. 16 is a flowchart showing the content of the control rule adjustment procedure according to Embodiment 1.

FIG. 16 is a flowchart showing the content of the control rule adjustment procedure according to Embodiment 1 (Step S3). It is assumed that a rule adjustment screen is displayed on a display device of the rule adjustment operation means 108 as a result of the procedure of Step S2. The individual steps will be described hereinafter.

In the control rule adjustment procedure, the rule adjustment operation means 108 determines whether or not any operation on the rule adjustment operation means 108 (Step D6) has been received. If any operation is received from the resident (Step D6; YES), the rule adjustment operation means 108 identifies an operation-target input icon or output icon on the rule adjustment screen (Step S301). If no operation is received (Step D6; NO), the rule adjustment operation means 108 stands by until an operation is received.

The icon is identified based on the icon display position calculated for displaying the rule adjustment screen. The icon is identified as an input, output, or execution adjustment icon, and which row of the adjustment screen information 1061 the icon corresponds to is identified. In Step S301, if the user interface of the rule adjustment operation means 108 of the remote controller 30 is a touch panel or an interface consisting of a pointer and an operation button, the operation target can be identified from the coordinates and icon display range. If the user interface of the rule adjustment operation means 108 is an interface consisting of a combination of an object shifting button and an operation button, the icon that is selected when the operation button is pressed may be identified as the operation target. The object shifting button is a button for changing an icon to be selected, such as a cross key. The operation button is a button that changes the state of an icon, such as an execution button or a +/− button.

Next, the rule adjustment operation means 108 makes reference to the content of the rule adjustment screen memory 106 and determines whether or not adjustment of the identified operation-target icon is permitted (Step D7). Whether or not adjustment of the icon is permitted or prohibited is determined by making reference to the content of the control value adjustment permission of the adjustment screen information 1061 when the operation-target icon is an input icon or output icon, or by making reference to the content of the execution adjustment permission of the adjustment screen information 1061 when the operation-target icon is an execution adjustment icon.

If the adjustment is permitted (Step D7; YES), the rule adjustment operation means 108 stops the operation of the air conditioner automatic control means 104 prior to the adjustment (Step S302). If the adjustment is prohibited (Step D7; NO), the presence or absence of a subsequent operation is determined from the rule adjustment operation means 108 (Step D6).

After the Step S302, the rule adjustment operation means 108 updates the content of the control value in the adjustment screen information 1061 in the case of the operation target being an input or output icon, or the content of the execution information in the adjustment screen information 1061 in the case of the operation target being an execution adjustment icon to the content selected as a result of the operation (Step S303).

Then, the rule adjustment operation means 108 determines the specific adjustment target corresponding to the operation-target icon in accordance with the result already determined in the Step D7 (Step D8).

If the operation-target icon is an input icon (Step D8; Input determination formula), the adjustment target is the input determination formula 1051. The rule adjustment operation means 108 makes reference to the input/output number in the adjustment screen information 1061 and updates the input evaluation value $1051d$ of the corresponding input determination formula 1051 in the automatic control rule memory 105 to the value selected as a result of the operation (Step S304$a$).

If the operation-target icon is an output icon (Step D8; Output-setting formula), the adjustment target is the output-setting formula 1052. The rule adjustment operation means 108 makes reference to the input/output number in the adjustment screen information 1061 and updates the output-setting value $1052c$ of the corresponding output-setting formula 1052 in the automatic control rule memory 105 to the value selected as a result of the operation (Step S304$b$).

If the operation-target icon is an execution adjustment icon, the adjustment target is the input/output execution information 1054 corresponding to the input/output connection formula 1053 (Step D; Input/output execution information). The rule adjustment operation means 108 makes reference to the input/output number in the adjustment screen information 1061 and updates the content of the corresponding input/output execution information 1054 in the automatic control rule memory 105 to the value selected as a result of the operation (Step S304$c$).

After completing the processing of the Steps S304$a$ to S304$c$, the rule adjustment operation means 108 resumes the operation of the air conditioner automatic control means 104 (Step S305).

Specific Examples

Operation of the air conditioner control device 10 will be described using a case in which the automatic control content of "operating an air conditioner 40 in an air-conditioning mode with a moderate air flow when the temperature of a room A is 26° C. or higher and the humidity thereof is 70% or higher" is stored in the automatic control rule memory 105.

The air conditioner 40 is installed in a room A. The air conditioner 40 is composed of a room unit 40$a$, a temperature sensor 40$b$, and a humidity sensor 40$c$ (which are not shown in FIG. 1). The room unit 40$a$ is the main body of the air conditioner 40, and air-conditions the room A under the control of the air conditioner control device 10. The temperature sensor 40$b$ is a sensor measuring the temperature around the room unit 40$a$. The humidity sensor 40$c$ is a sensor measuring the humidity around the room unit 40$a$.

The measurements (temperature and humidity) of the temperature sensor 40$b$ and humidity sensor 40$c$ that are acquired by the system communication means 102 via the network 20 and the values of the operation mode and air flow of the room unit 40$a$ are stored in the air-conditioning information memory 101 of the remote controller 30 as the air-conditioning information 1011 as shown in FIG. 2.

The attributes of the information stored in the air-conditioning information memory 101 are defined in the attribute definition information 1071 as shown in FIG. 7.

By making reference to the attribute definition information 1071, it is understood that the air-conditioning information 1011 in FIG. 2 indicates that the temperature of the room A is 27° C., the humidity is 80%, the operation mode is "off" which corresponds to a value "0," and the air flow is "high" which corresponds to a value "2." In other words, the air conditioner 40 is currently not in operation.

The icons that correspond to the attributes of temperature, humidity, operation mode, and air flow, are defined in the icon definition information 1072 as shown in FIG. 8. With regard to temperature and humidity, the icons corresponding to combinations with two operators, "<" and ">," are defined. The icons are shown in FIG. 9.

As shown in FIGS. 3 to 6, two input determination formula 1051, two output-setting formula 1052, one input/output connection formula 1053, and one piece of input/output execution information 1054 are entered into the automatic control rule memory 105 by the operator through the control rule input means 109.

The input determination formula 1051 define the following content:
(Input number "1") Temperature >26(° C.); and
(Input number "2") Humidity >70(%).

The output-setting formula 1052 define the following content:
(Output number "1") Operation mode=2 (air-conditioning); and
(Output number "2") Air flow=1 (moderate).

The input/output connection formula 1053 states in which the output numbers "1" and "2" are executed when the input numbers "1" and "2" are verified. The input/output execution information 1054 states that the input numbers "1" and "2" and output numbers "1" and "2" are "valid."

On the other hand, the rule adjustment screen generation means 107 retains control value adjustment permission information 1073, which was entered by the operator through the adjustment permission information input means 110 and indicates that adjustment of the control values of the input number "2" and output number "2" is "permitted", and execution adjustment permission information 1074, which indicates that adjustment of the execution information of the input numbers "1" and "2" is "permitted", as shown in FIGS. 10 and 11. The above information is generated, for example, on the assumption that adjustment of the input number "2" is permitted to make the humidity suitable for the feature of the installed location of the humidity sensor 40c, adjustment of the output number "2" is permitted to make the air-conditioning air flow suitable for a preference of the resident, and adjustment of the execution information of the input numbers "1" and "2" is permitted in case of failure of the sensors.

Operation in the air conditioner automatic control procedure Step S1 will be described. The system communication means 102 receives a control signal indicating the state of the air conditioner 40 from the network 20 as described above (Step D1; YES). After analyzing the control signal, the system communication means 102 stores values "27" and "80" in the air-conditioning information memory 101 at the addresses corresponding to the air-conditioning information numbers "1" and "2", as shown in FIG. 2 (Step S101). Since the attributes corresponding to the air-conditioning information numbers "1" and "2" in the attribute definition information 1071 are temperature and humidity, respectively, it is understood that the stored values "27" and "80" refer to a temperature of 27° C. and humidity of 80%, respectively.

In response to the update of the air-conditioning information memory 101, the air conditioner automatic control means 104 determines whether or not there is an input determination formula 1051 corresponding to the updated information (Step D3). Since the air-conditioning information numbers "1" and "2" of the updated information are registered in the input information numbers 1051b corresponding to the input numbers "1" and "2" in the input determination formulae 1051, it is determined that there are corresponding input determination formulae 1051 (Step D3; YES).

Then, the air conditioner automatic control means 104 inputs the updated values "27" and "80" as the temperature value and humidity value into the input determination formulae 1051 having the input numbers "1" and "2" corresponding to the updated values, respectively (Step S103). As a result of this input, the air conditioner automatic control means 104 determines whether or not the input determination formula 1051 having the input numbers "1" and "2" are verified for the updated values in the air-conditioning information memory, respectively. In the example of FIG. 3, the updated values "27" and "80" are greater than the input evaluation values "26" and "70," respectively. Therefore, the input determination formula 1051 is determined to be verified for both updated values (Step S104).

Next, the air conditioner automatic control means 104 extracts the input/output connection formula 1053 containing the input determination formula 1051 regarding the updated inputs from the automatic control rule memory 105 for determining the output to be executed in accordance with the updated inputs.

In the example of the input/output connection formula 1053 shown in FIG. 5, the input numbers "1" and "2" of the input determination formula 1051 are stored in the input/output connection formula 1053. Furthermore, in the example of the input/output execution information 1054 shown in FIG. 6, the execution information is valid for both input numbers "1" and "2." Therefore, the air conditioner automatic control means 104 obtains the logical product of the determination results of the input determination formula 1051 having the input numbers "1" and "2" and determines that the input of the input/output connection formula 1053 is verified.

In response to the verification, the air conditioner automatic control means 104 determines the output-setting formula 1052 stored in the field of the output number of the input/output connection formula 1053 as the output setting formula 1052 to be executed (Step S105).

In the input/output connection formula 1053 shown in FIG. 5, the output numbers "1" and "2" are stored as the output-setting formula 1052. Furthermore, in the example of the input/output execution information 1054 shown in FIG. 6, the output execution information is valid for both output the numbers "1" and "2." Therefore, the air conditioner automatic control means 104 determines the output-setting formula 1052 having the output numbers "1" and "2" as the output-setting formula 1052 to be executed.

Then, the air conditioner automatic control means 104 sets the value of the air-conditioning information 1011 in the air-conditioning information memory in accordance with the determined output-setting formula 1052 (Step S106).

In the example of the output-setting formula 1052 shown in FIG. 4, the output information numbers 1052b corresponding to the output numbers "1" and "2" are "3" and "4" and the corresponding output-setting values 1052c are "2" and "1," respectively. The output information number 1052b corresponds to the air-conditioning information number of the air-conditioning information 1011 stored in the air-conditioning information memory 101 shown in FIG. 2. The air conditioner automatic control means 104 sets the value corresponding to the air-conditioning information number "3" ("0" in FIG. 2) to "2" and the value corresponding to the air-conditioning information number "4" ("2" in FIG. 2) to "1" in the air-conditioning information 1011 in the air-conditioning information memory 101 in accordance with the output-setting formula 1052 having the output numbers "1" and "2." The attributes of the output information numbers "3" and "4" are the operation mode and air flow, respectively, from the attribution definition information 1071 shown in FIG. 7. Accordingly, the content of the air-conditioning information memory 101 is changed to operation mode "2". In other words, the content is changed to "air-conditioning" and air flow "1", or more specifically air flow "moderate."

In response to the change in the air-conditioning information memory 101, the system communication means 102 determines whether or not the change in the air-conditioning information memory 101 relates to the air conditioner control (Step D4). The values in the output-setting formula 1052 that are updated in this example are the operation mode and air flow, both of which have been determined as relating to the air conditioner control (Step D4; YES).

Accordingly, the system communication means 102 sends a control signal corresponding to the operation mode "2", in other words, "air-conditioning" and air flow "1", or "moderate", to the room unit 40a via the network 20.

A specific example of the adjustment screen generation procedure in the adjustment screen generation/display procedure Step S2 will be described using the example of the input/output connection formula 1053 shown in FIG. 5 and with reference to FIG. 14.

First, the rule adjustment screen generation means 107 acquires an input/output connection formula 1053 from the automatic control rule memory 105 for generating adjustment screen information 1061 (Step S201). The following procedure is executed for all inputs/outputs of the acquired input/output connection formula.

The input numbers "1" and "2" and output numbers "1" and "2" are stored in the input/output connection formula 1053 in FIG. 5. The rule adjustment screen generation means 107 acquires the input determination formula 1051 corresponding to the input number and the output-setting formula 1052 corresponding to the output number from the automatic control rule memory 105 (Step S202). The input evaluation values 1051*d* and output-setting values 1052*c* acquired correspond to the control values of the adjustment screen information 1061. For example, the control value corresponding to the input number "1" is "26."

Then, the rule adjustment screen generation means 107 determines whether the processing target corresponds to an input number or an output number in the input/output connection formula 1053 (Step D5). In the case of the input number "1" (Step D5; Input), the rule adjustment screen generation means 107 acquires the air-conditioning information number "1" shown in FIG. 2 from the input information number 1051*b* (see FIG. 3) corresponding to the input number "1" in the input determination formula 1051 acquired in the Step S202, and acquires "temperature" as the attribute corresponding to the air-conditioning information number "1", namely the input number "1" from the attribute definition information 1071 of FIG. 7 (Step S203*a*).

Next, the rule adjustment screen generation means 107 acquires from the icon definition information 1072 an icon "lower limit thermometer" as the icon corresponding to the combination of the attribute "temperature" and an operator ">" in the input determination formula 1051 having the input number "1" (Step S204*a*).

Furthermore, the rule adjustment screen generation means 107 obtains that "26", which is the input evaluation value 1051*d* corresponding to the input number "1" in the input determination formula 1051 is prohibited to be adjusted as the input number "1" is not included in the control value adjustment permission information 1073, and determines the content of the control value adjustment permission to be "prohibited" (Step S205).

Furthermore, the rule adjustment screen generation means 107 acquires the input/output execution information 1054 from the automatic control rule memory 105 (Step S206) and finds that the execution information for the input number "1" is valid from the input/output execution information 1054.

The rule adjustment screen generation means 107 subsequently determines that the execution adjustment permission information 1074 contains the input number "1," acquires that the adjustment of the input execution information for the input number "1" is permitted, and determines the content of the execution adjustment permission to be "permitted" (Step S207).

The content of the icon, control value, control value adjustment permission, execution information, and execution adjustment permission corresponding to the linkage number "1," input/output classifier "input," and input/output number "1" in the adjustment screen information 1061 shown in FIG. 12 are the content obtained in the Steps S201, S202, S204*a*, S205, S206, and S207. The rule adjustment screen generation means 107 stores the adjustment screen information 1061 obtained as described above in the rule adjustment screen memory 106 (Step S208).

The Steps D5 to S208 are similarly repeated for the input number "2" and output numbers "1" and "2" in the input/output connection formula 1053. In the case of the output numbers, the content of Steps S203*b* and S204*b* is executed in place of the Steps S203*a* and S204*a*. The Step S203*b* is a procedure to acquire the attribute of output information from the attribute definition information 1071. The Step S204*b* is a procedure to acquire an icon corresponding to the attribute from the icon definition information 1072.

In this way, the rule adjustment screen generation means 107 generates the adjustment screen information 1061 as shown in FIG. 12 and stores the adjustment screen information 1061 in the rule adjustment screen memory 106. Moreover, it is possible to execute the Step S208 after the processing up to the Step S207 is completed for all input numbers 1051*a* and output numbers 1052*a* in the input/output connection formula 1053 instead of executing the processing for each of the input numbers 1051*a* and output numbers 1052*a*.

Figure 17:
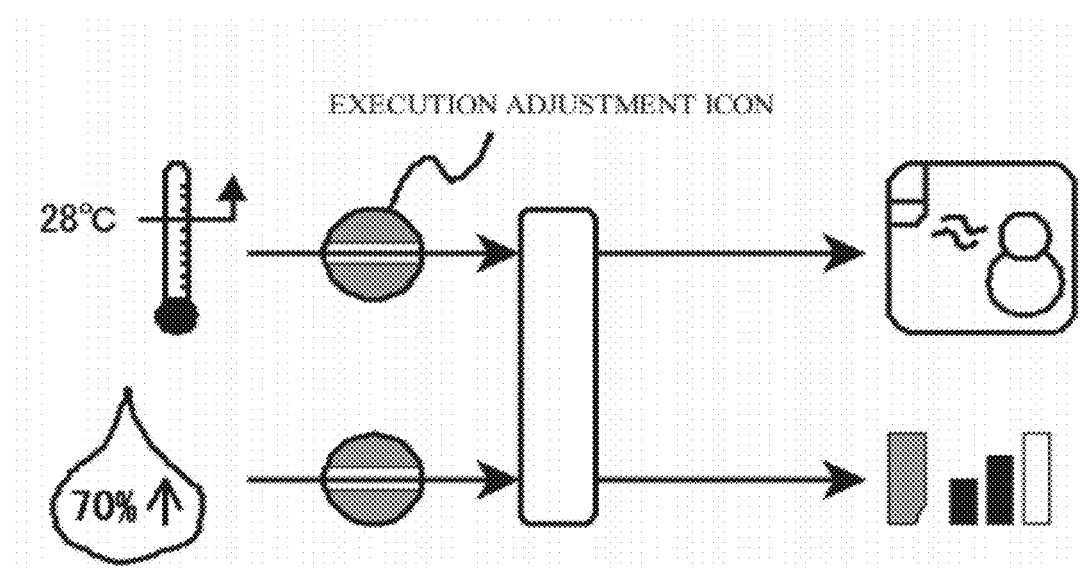
FIG. 17 shows an exemplary rule adjustment screen displayed by the rule adjustment operation means according to Embodiment 1.

A specific example of the adjustment screen display procedure in the adjustment screen generation/display procedure Step S2 will be described hereafter with reference to FIG. 15. FIG. 17 shows an exemplary rule adjustment screen to be displayed by the rule adjustment operation means.

The rule adjustment operation means 108 acquires the adjustment screen information 1061 from the rule adjustment screen memory 106 (Step S251).

The rule adjustment screen is displayed on the basis of a linkage number in the adjustment screen information 1061. The adjustment screen information 1061 has two input numbers and two output numbers corresponding to the linkage number "1." The rule adjustment operation means 108 determines the display positions of the icons corresponding to the two input numbers and two output numbers on the display screen. For example, the rule adjustment operation means 108 calculates the display positions to display an icon for the input number "1" (a lower limit thermometer icon) at the top left, an icon for the input number "2" (a lower limit water droplet icon) below the lower limit thermometer icon, an icon for the output number "1" (an air-conditioning icon) at the top right, and an icon for the output number "2" (a three-level air flow icon (hereinafter, referred to as an "air flow icon")) below the air-conditioning icon. Furthermore, since the execution adjustment is "permitted," there is a corresponding execution adjustment icon. The display positions are calculated to display the two execution adjustment icons in the right of the icons for the input numbers "1" and "2" (Step S252).

The rule adjustment operation means 108 subsequently displays the two input icons and two output icons including the control values corresponding to the input numbers "1" and "2" and output numbers "1" and "2" therein as parameters (Step S253).

The rule adjustment operation means 108 subsequently displays connection lines between the input icons for the input numbers "1" and "2" and between the output icons for the output numbers "1" and "2" (Step S254). Furthermore, in order to obtain a logical product of the input numbers "1" and "2" in the input/output connection formula 1053, a rectangular outline indicating the logical product of the input numbers "1" and "2" is placed between the connecting lines from two input icons and the connecting lines from two output icons, as shown in FIG. 17.

The rule adjustment operation means 108 sequentially displays the execution adjustment icons including the execution information as parameters on the connection lines for indicating that the change on the valid/invalid of the execution information is "permitted" (Step S255). The execution adjustment icon is, for example, an icon having a slot along the connection line, as shown in FIG. 17, for indicating that the execution information is "valid." For an adjustment to "invalid," for example, the execution adjustment icon is rotated by 90° on the screen.

The rule adjustment screen shown in FIG. 17 is created as described above and output on a display device (Step S256).

A specific example of the control rule adjustment procedure Step S3 will be described with reference to FIG. 16. It is assumed that the rule adjustment operation means 108 is provided with a touch panel as an interface and the resident will make adjustment for "reducing the air flow" and "invalidating the humidity sensor."

The screen shown in FIG. 17 is displayed on a display device of the rule adjustment operation means 108 on the basis of linkage number in the adjustment screen information 1061. The rule adjustment operation on the linkage number 1 will be described hereinafter with reference to FIG. 17.

The rule adjustment operation means 108 determines whether or not there is any rule adjustment operation (Step D6). If there is no adjustment operation (Step D6; NO), the Step D6 is repeated. For the rule adjustment of "reducing the air flow," the resident touches the air flow icon at the bottom right on the screen. The air flow icon is configured to increase/reduce the air flow and the resident operates on the air flow icon to "reduce the air flow" (Step D6; YES).

The rule adjustment operation means 108 analyzes the operation content and identifies the operation target icon in the adjustment screen information 1061 (Step S301). The identification is conducted based on the operation position on the screen.

Furthermore, the rule adjustment operation means 108 determines whether or not the adjustment of the operation target icon is permitted by identifying the operation target icon (Step D7). The adjustment of the icon is determined to be permitted because the control value corresponding to the input/output classifier "output" and the input/output number "2" (namely, the output number "2") of the linkage number "1" in the adjustment screen information 1061 which is the adjustment target is an adjustment target and "permitted" is set in the control value adjustment permission field corresponding to this control value (Step D7; YES).

The rule adjustment operation means 108 sequentially moves up/down the scale indicating the air flow measure on the screen according to the resident' operation of "reducing the air flow," stops the air conditioner automatic control means 104 (Step S302), and changes the control value corresponding to the output number "2" in the adjustment screen information 1061 stored in the rule adjustment screen memory 106 to a numeric value corresponding to "reducing the air flow" (Step S303).

Then, the rule adjustment operation means 108 determines the specific adjustment target of the icon (Step D8). Since the adjustment target is found to be the control value corresponding to the output number "2" in the Step S303, the rule adjustment operation means 108 determines that the specific adjustment target of the icon is the output-setting formula 1052 (Step D8; output-setting formula), and changes the output-setting value 1052c in the output-setting formula 1052 stored in the automatic control rule memory 105 to a numeric value corresponding to "reducing the air flow" (Step 304b). Accordingly, the rule adjustment operation means 108 resumes the operation of the air conditioner automatic control means 104 (Step S305).

For the adjustment of "invalidating the humidity sensor," the resident touches the execution adjustment icon to the right of the lower limit water droplet at the bottom left on the screen shown in FIG. 17 (Step D6; YES). In the same manner as described above, the operation content is analyzed and the target icon is identified as the execution adjustment icon for the input number "2" in the adjustment screen information 1061 (Step S301).

Furthermore, the rule adjustment operation means 108 confirms that the content of the execution adjustment permission for the input number "2" corresponding to the identified icon in the adjustment screen information 1061 is "permitted," and determines that adjustment of this execution adjustment icon is permitted (Step D7).

The execution adjustment icon is configured to be switched between "valid" and "invalid." For example, the resident rotates the execution adjustment icon by 90° to switch to "invalid." Then, the rule adjustment operation means 108 displays the execution adjustment icon rotated by 90° on the screen in accordance with the operation of the resident for invalidating the execution adjustment icon and stops the air conditioner automatic control means 104 (Step S302).

Afterwards, the content of the execution information for the input number "2" in the adjustment screen information 1061 stored in the rule adjustment screen memory 106 is changed to "invalid" (Step S303).

The rule adjustment operation means 108 subsequently determines the specific adjustment target of the icon (Step D8). Since the adjustment target icon is an execution adjustment icon, the rule adjustment operation means 108 determines that the specific adjustment target of the icon is the input/output execution information 1054.

The rule adjustment operation means 108 subsequently changes the input execution information corresponding to the input number "2" in the input/output execution information 1054 stored in the automatic control rule memory 105 to "invalid" (the input number "2" can be derived from the input/output connection formula 1053 corresponding to the input/output execution information 1054) (Step S304c). Accordingly, the rule adjustment operation means 108 resumes the operation of the air conditioner automatic control means 104 (Step S305). And, the control rule adjustment procedure ends.

As described above, according to Embodiment 1, the resident can easily adjust the control content of the control program defined by the operator and the adjustment achieves air conditioner control suitable for the preference of the resident or a daily change in the environmental conditions.

Furthermore, by having the resident merely performing the operation of the automatic control rule adjustment, the adjustment screen information is automatically generated by the rule adjustment screen generation means 107. During the adjustment of the rule, the rule adjustment operation means 108 creates a rule adjustment screen based on the adjustment screen information and displays and presents the rule adjustment screen on a display device to the resident. The resident can adjust the rules on the screen through a simple operation, whereby the workload of the resident can be reduced with adjustment of the rules. Furthermore, the input determination formula, output-setting formula, and input/output connection formula are introduced, whereby not only the air conditioner control, but also the automatic rule adjustment can be facilitated. In addition, the icons on the rule adjustment screen can be defined not only based on the attribute of an adjustment target value but also in a combination with an operator indicating the content of determination to be executed using the value, providing a rule adjustment screen making it easy for the resident to intuitively understand the entire meaning of the rules including the determinations. Consequently, the workload of the resident with the rule adjustment operation can be reduced. The same effect that is expected by an adjustment made by the resident can also be expected by an adjustment made by the operator.

Furthermore, according to the present embodiment, the operator can set a limit on the range of rule adjustment by the resident, preventing control problems that may be caused by an improper change by the resident. For example, the rule adjustment can be limited to a range complying with an energy-saving policy of the building administrator.

Furthermore, the input and output of the remote controller 30 relating to the automatic control rules can be partially validated or invalidated. Therefore, if an air conditioner 40 or an internal sensor thereof fails, the input execution information from such a sensor can be made "invalid," whereby the automatic control relating to the sensor can be quickly discontinued. Furthermore, provided that the operator prepares plural outputs, a function can be provided for the resident to select an operation when the input is verified.

In the above explanation, the control content is entered through the control rule input means 109 and stored in the automatic control rule memory 105. However, the control content can be stored in advance.

Furthermore, the control value adjustment permission information 1073 and execution adjustment permission information 1074 entered through the adjustment permission information input means 110 indicate the item of which adjustment is permitted. Such information can indicate the items of which adjustment is prohibited. Furthermore, such information can automatically be determined by the rule adjustment screen generation means 107 instead of being entered through the adjustment permission information input means 110.

Furthermore, in the example shown in FIG. 7, different attributes are defined for different air-conditioning information numbers in the air-conditioning information 1011, respectively. For example, the same attribute "temperature" may be applied to a set temperature and room temperature which correspond to different air-conditioning information numbers, respectively.

Furthermore, in the operation of the control rule adjustment procedure Step S3, when adjustment of the operation target icon is permitted, the operation of the air conditioner automatic control means 104 is stopped. When the rule adjustment operation means 108 has an interface with which the resident can enter the end of rule adjustment, the input of the end of the rule adjustment may be followed by a series of processing that includes determining whether adjustment of the target icon is permitted, stopping the operation of the air conditioner automatic control means 104, changing the content of the rule adjustment screen memory 106, and resuming the operation of the air conditioner automatic control means 104.

Without the input of the end of the rule adjustment operation, stopping the operation, changing the content of the rule adjustment screen memory 106, and resuming the operation are executed with each operation by the user via the rule adjustment operation means 108. If there are plural rules to adjust, such stopping, changing, and resuming by each adjustment operation may cause control to be executed with incomplete rules in the middle of the rule adjustment. With input of the end of rule adjustment operation, the operation is stopped, the rules are changed, and the operation is resumed only after input of the end of the rule adjustment operation. Therefore, the above incident can be prevented.

Embodiment 2

In Embodiment 1, the air conditioner control device 10 is connected to the network 20 of an air-conditioning system in which plural air conditioners 40 are communicably connected. The air conditioner control device 10 can simultaneously be connected to another network consisting of other external devices, in addition to the network 20. Components common to Embodiment 1 are appended by the same reference number, and any explanation thereon has been omitted.

(Configuration of the Air Conditioner Control Device 10)

Figure 18:
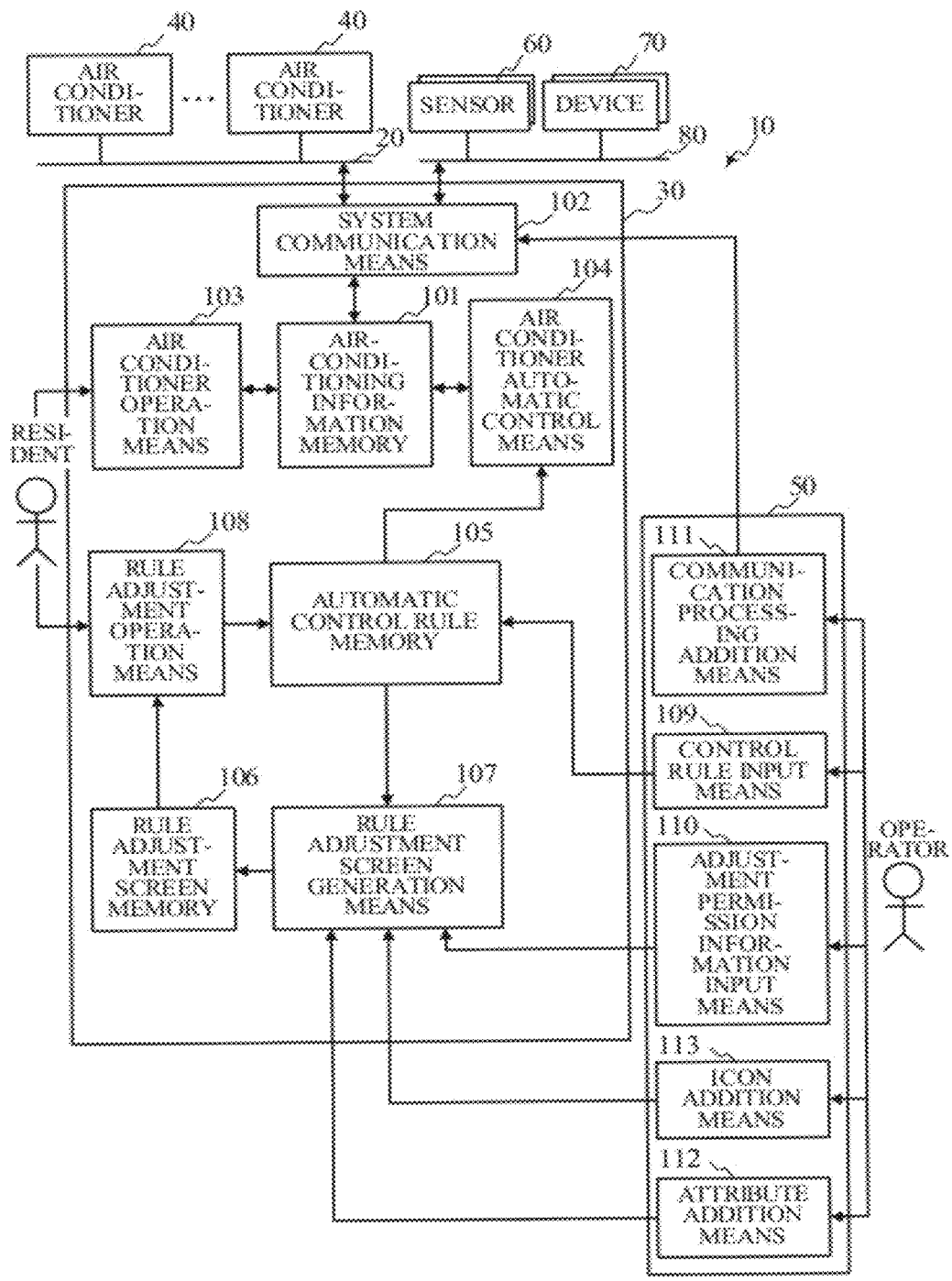
FIG. 18 is a block diagram showing an exemplary configuration of the air conditioner control device according to Embodiment 2 of the present invention and the periphery thereof.

FIG. 18 is a block diagram showing an exemplary configuration of the air conditioner control device 10 according to Embodiment 2 of the present and periphery thereof.

The remote controller 30 of the air conditioner control device 10 of Embodiment 2 is connected to a network 80 consisting of external devices, in addition to the network 20 of an air-conditioning system. The network 80 can be the same network as the network 20. External devices connected to the network 80 include a total number of sensor 60 and device 70 that is at least one. The sensor 60 is a temperature sensor or a humidity sensor. The device 70 is a device supporting air-conditioning such as a humidifier or a circulator. If the air conditioner 40 does not have such functions, this type of sensor and device may be used.

The air conditioner control device 10 has a terminal 50 further comprising a communication processing addition means 111, an attribute addition means 112, and an icon addition means 113, in addition to the configuration of the air conditioner control device 10 according to Embodiment 1. Each of the communication processing addition means 111, attribute addition means 112, and icon addition means 113 are provided with an interface for the operator to operate.

The communication processing addition means 111 adds to the system communication means 102 a process to receive the control signal from the external devices, change the content of the air-conditioning information memory 101 with regard to the external devices, and send the control signal for the external devices to the network 80 based on the changed content of the air-conditioning information memory 101. With this process, the system communication means 102 is provided with an external device communication function, and in that sense, provided with an external device communication means.

The attribute addition means 112 adds the attribute definition information 1071 for the content of the air-conditioning information memory 101 with regard to the external device.

The icon addition means 113 adds the icon definition information 1072 corresponding to the attribute added by means of the attribute addition means 112 with regard to the external device.

(Outline of Operation of the Air Conditioner Control Device 10)

The air conditioner control device 10 according to Embodiment 2 operates in the same manner as the air conditioner control device 10 according to Embodiment 1 with respect to the network 80 consisting of the external device through the communication processing addition means 111, attribute addition means 112, and icon addition means 113.

For example, when a sensor 60 is provided as an external device and the output therefrom is received as a control signal via the system communication means 102 to use the control signal for controlling the air conditioner 40, the system communication means 102 receives the control signal from the sensor 60 and sends the control signal to the air conditioner 40 based on the control signal in the same manner as described in Embodiment 1. In such a case, the air-conditioning system can be configured by the air-conditioning system of Embodiment 1 with the addition of a sensor 60.

On the other hand, when a device 70 supporting air-conditioning such as a humidifier and circulator is provided as an external device, the system communication means 102 also sends control signals to the device 70 in addition to the air conditioner 40. Here, an air-conditioning system including a device 70 (equipment) supporting the air conditioner 40 is defined as a facility/equipment system. In a facility/equipment system, the device 70 is also controlled in the same manner as the air conditioner 40 in addition to the control of the air conditioner 40 as described in Embodiment 1. A facility/equipment system may include sensors 60, or may not include sensors 60 where the air conditioner 40 is provided with sensors.

In Embodiment 2, the air conditioner control device 10 can utilize the sensor 60 and/or device 70 that are not included in the original air-conditioning system for control of the air conditioner 40 or for control of indoor environment including control of the air conditioner 40, in order to achieve a more flexible air-conditioning control.

In the same manner for the sensor and actuator included in the air conditioner 40 of the air-conditioning system according to Embodiment 1, a control rule adjustment screen can be created for the external device and the resident can easily adjust the control rules including the external devices. Furthermore, an icon regarding the external device can additionally be used on the screen. Adjustment can be facilitated even if an external device is included.

Each of the above embodiments is merely an example of the present invention, and thus various modifications and applications thereof are possible. For example, in the above embodiments, the rule adjustment screen generation means 107 is provided on the remote controller 30. However, the rule adjustment screen generation means 107 can be provided on the terminal 50. Furthermore, the attribute definition information 1071, icon definition information 1072, control value adjustment permission information 1073, and execution adjustment permission information 1074 in the rule adjustment screen generation means 107 can be at least partly stored directly in the remote controller 30.

In the above explanation, in order for the remote controller 30 to automatically control the air conditioner 40, the automatic control rule memory 105 stores the input determination formula 1051, output-setting formula 1052, input/output connection formula 1053, and input/output execution information 1054. However, as long as the remote controller 30 is able to automatically control the air conditioner 40 to the same effect as the content of the above explanation, the storage format and content classification in the automatic control rule memory 105 is not confined to the above-described examples.

Furthermore, in the above explanation, in order for the remote controller 30 to create a rule adjustment screen used in adjusting the automatic control rules, the rule adjustment screen generation means 107 has the attribute definition information 1071, icon definition information 1072, control value adjustment permission information 1073, and execution adjustment permission information 1074. However, as long as the remote controller 30 is able to create a screen for adjusting the automatic control rules to the same effect, the individual information internal structures and overall information structure in the rule adjustment screen generation means 107 is not confined to the above-described embodiments.

The flowcharts shown in FIGS. 13 to 16 explain not only the operation of the air conditioner control device 10, but also the air conditioner control method.

The air conditioner control device 10 composed of: a CPU; a ROM storing an operation program; a RAM serving as a temporal storage region during the operation; a user interface for the resident to operate; and a communication interface for connecting to the network 20 or terminal 50; and/or the like, which is considered to be a computer system. As a computer system, the air conditioner control device 10 operates by reading the operation program that is the computer program stored in the ROM and executing the program. The flowcharts shown in FIGS. 13 to 16 also show the content of the air conditioner control program executed in such a case.

The air conditioner control program can be stored and distributed on a computer-readable recording medium (a flexible disc, CD-ROM, DVD-ROM, and/or the like). The program can be installed on a computer to constitute the air conditioner control device 10 executing the above-described procedures. Alternatively, the computer program can be stored in a storage device of a server unit on a communication network such as the Internet, and downloaded etc. by a conventional computer system to constitute the air conditioner control device 10.

Furthermore, when the function of the air conditioner control device 10 is achieved by sharing or the collaboration of OS (operation system) and an application program, only the application program can be stored on a recording medium or in a storage device.

Various modifications may be made to the above embodiments without departing from the scope of the present invention. The above embodiments are provided in order to describe the present invention, rather than to limit the scope thereof. The scope of the present invention is defined by the appended claims, rather than the embodiments. Moreover, the various modifications that may be made within the scope of claims and within a range equivalent to the claims of the invention are included within the scope of the present invention.

The present application is based on Japanese Patent Application No. 2009-215729 filed on Sep. 17, 2009, which is hereby incorporated by reference in its entirety.

INDUSTRIAL APPLICABILITY

An application of the present invention is an indoor equipment management system including an air conditioner. The present invention not only provides an automatic control customized to a building by an operator but also yields the effect whereby the resident can adjust some of the automatic control rules in accordance with the conditions. Consequently, it is possible to execute an air conditioner control that is more suitable and less of a burden on the resident, for example, under the restriction of energy-saving control.

REFERENCE SIGNS LIST

10 air conditioner control device
20 network
30 remote controller
40 air conditioner
50 terminal
60 sensor
70 device
80 network
101 air-conditioning information memory
102 system communication means
103 air conditioner operation means
104 air conditioner automatic control means
105 automatic control rule memory 106 rule adjustment screen memory
107 rule adjustment screen generation means
108 rule adjustment operation means
109 control rule input means
110 adjustment permission information input means
111 communication processing addition means
112 attribute addition means
113 icon addition means
1011 air-conditioning information
1051 input determination formula
1052 output-setting formula
1053 input/output connection formula
1054 input/output execution information
1061 adjustment screen information
1071 attribute definition information
1072 icon definition information
1073 control value adjustment permission information
1074 execution adjustment permission information

The invention claimed is:

1. An air conditioner control device for controlling at least one air conditioner connected to a network, comprising:
an air-conditioning information memory storing data presenting a state of the air conditioner as air-conditioning information;
an automatic control rule memory storing automatic control rules serving as criteria for determining a control content of the air conditioner;
an air conditioner operator that receives an operation that changes the air-conditioning information;
an air conditioner automatic controller that determines the control content of the air conditioner based on the air-conditioning information and automatic control rules, and changes the data in a corresponding part of the air-conditioning information stored in the air-conditioning information memory to the determined control content;
a system communicator that receives a signal indicating the state of the air conditioner from the network, updates the data of the air-conditioning information memory, and sends to the network the update of the air-conditioning information and the control content of the air conditioner determined in accordance with the change as control signals;
a rule adjustment screen memory storing adjustment screen information that is information for creating a rule adjustment screen used for changing the content of the automatic control rule memory;
a rule adjustment screen generator that generates the adjustment screen information based on the content of the automatic control rule memory and stores the adjustment screen information in the rule adjustment screen memory; and
a rule adjustment operator that creates the rule adjustment screen based on the adjustment screen information, displays the rule adjustment screen on a display device, and receives an operation to adjust the content of the automatic control rule memory on the displayed rule adjustment screen, wherein:
the state of the air conditioner refers to environmental information of the air conditioner, which is input information entered into the air conditioner control device from the network, and the control content of the air conditioner refers to information indicating operation of said air conditioner, which is output information output to the network from the air conditioner control device,
the automatic control rule memory stores an input determination formula, an output-setting formula, and an input/output connection formula,
the input determination formula includes an input evaluation value and an operator defining a relationship of the input information with the input evaluation value and is a formula for determining whether or not the input information satisfies the input determination formula,
the output-setting formula includes an output-setting value, and is a formula for setting the output information based on the output-setting value,
the input/output connection formula defines a relationship between at least one of the input determination formula and at least one of the output-setting formula as connected when the relationship between the input determination formula and the output-setting formula exists, and
the air conditioner automatic controller updates the air-conditioning information based on the output-setting formula connected by the input/output connection formula when the input information satisfies the input determination formula.

2. The air conditioner control device according to claim 1, wherein
the rule adjustment screen generator has attribute definition information defining attributes of the input information and the output information in the air-conditioning information, and icon definition information defining an icon for each of the attributes or for each combination of the attributes and operators, and
determines an icon corresponding to the input determination formula and an icon corresponding to the output-setting formula based on the attribute definition information and icon definition information, generates adjustment screen information in order to create the rule adjustment screen for adjusting the input evaluation value and the output-setting value using the icons, and stores the adjustment screen information in the rule adjustment screen memory.

3. The air conditioner control device according to claim 2, wherein
the rule adjustment screen generator has control value adjustment permission information indicating that adjustment of the input evaluation values and output-setting values is permitted or prohibited;
the adjustment screen information includes the control value adjustment permission information; and
the rule adjustment screen is a screen on which the icons for the input evaluation value and the output-setting value of which adjustment is permitted are operable, and icons for the input evaluation value and the output-setting value of which adjustment is inhibited are inoperable based on the control value adjustment permission information.

4. The air conditioner control device according to claim 2, wherein
the automatic control rule memory stores input/output execution information indicating each of the input determination formula and output-setting formula connected by the input/output connection formula is valid or invalid;
the air conditioner automatic controller updates the air-conditioning information based on the input/output execution information;
the adjustment screen information includes the input/output execution information; and the rule adjustment screen is a screen including an execution adjustment icon for adjusting the input/output execution information.

5. The air conditioner control device according to claim 4, wherein
the rule adjustment screen generator has execution adjustment permission information indicating that the adjustment of the input/output execution information is permitted or prohibited;
the adjustment screen information includes the execution adjustment permission information; and
the rule adjustment screen is a screen on which the execution adjustment icon of which adjustment is permitted is operable and the execution adjustment icon of which adjustment is inhibited is inoperable based on the execution adjustment permission information.

6. The air conditioner control device according to claim 3, further comprising an adjustment permission information input interface entering either one or both of the execution adjustment permission information and/or the control value adjustment permission information into the rule adjustment screen generator.

7. The air conditioner control device according to claim 2, wherein
the network is a network to which an external device of the air conditioner is further connected;
the air-conditioning information memory further stores the state of the external device;
the system communicator further comprises an external device communicator that receives a control signal from the external device, updates the content of the air-conditioning information memory, and sends the control signal for the air conditioner to the network based on the update of the air-conditioning information memory.

8. The air conditioner control device according to claim 7, wherein
the input determination formula, output-setting formula, and input/output connection formula are also applied to the input information and the output information intended for the external device, and
the air conditioner control device further comprises:
an attribute adder that adds to the attribute definition information, external device attribute definition information defining the attributes for information extracted from a control signal from the external device stored in the air-conditioning information memory and a control signal for the external device; and
an icon adder that adds to the icon definition information external device icon definition information defining an icon for each of the attributes defined in the external device attribute definition information or for the combination of attribute defined in the external device attribute definition information and the operator contained in the input determination formula corresponding to input information of the external device.

9. The air conditioner control device according to claim 7, wherein
the control signal from the external device includes a control signal from an equipment which is an external device having a function of supporting the air conditioner; and
the external device communicator sends a control signal for the equipment to the network based on an update of the air-conditioning information memory.

10. An air conditioner control device for controlling at least one air conditioner connected to a network, comprising:
a system communicator that receives a control signal indicating a state of the air conditioner from the network;
an automatic control rule memory that stores automatic control rules serving as criteria for determining a control content of the air-conditioner and for automatically controlling the air conditioner;
an air conditioner automatic controller that controls operation of the air conditioner based on the control signal indicating the state of the air conditioner and the automatic control rules;
a rule adjustment screen generator that generates adjustment screen information for adjusting content of the automatic control rule memory based on predetermined adjustment permission information; and
a rule adjustment operator that creates a rule adjustment screen based on the adjustment screen information and displays the rule adjustment screen and receives operation in order to adjust the automatic control rules via the displayed rule adjustment screen, wherein
the state of the air conditioner refers to environmental information of the air conditioner, which is input information entered into the air conditioner control device from the network, and the control content of the air conditioner refers to information indicating operation of said air conditioner, which is output information output to the network from the air conditioner control device,
the automatic control rule memory stores an input determination formula, an output-setting formula, and an input/output connection formula,
the input determination formula includes an input evaluation value and an operator defining a relationship of the input information with the input evaluation value and is a formula for determining whether or not the input information satisfies the input determination formula,
the output-setting formula includes an output-setting value, and is a formula for setting the output information based on the output-setting value,
the input/output connection formula defines a relationship between at least one of the input determination formula and at least one of the output-setting formula as connected when the relationship between the input determination formula and the output-setting formula exists, and
the air conditioner automatic controller updates the air-conditioning information based on the output-setting formula connected by the input/output connection formula when the input information satisfies the input determination formula.

11. An air-conditioning system, comprising:
an air conditioner; and
the air conditioner control device according to claim 1.

12. A facility/equipment system, comprising:
an air conditioner;
an equipment, which is an external device having a function of supporting the air conditioner; and
the air conditioner control device according to claim 9.

13. An air conditioner control method for controlling at least one air conditioner connected to a network, comprising:
an air-conditioning information receiving step receiving a control signal indicating a state of the air conditioner and storing data presenting the control signal in an air-conditioning information memory;
a control content determining step determining a control content of the air conditioner based on data of the air-conditioning information memory and data of an automatic control rule memory storing automatic control rules, and storing the determined control content in a corresponding part of the air-conditioning information memory as output information;

a control signal transmitting step transmitting the output information in the air-conditioning information memory to the network as a control signal for the air conditioner after the control content determining step;

an adjustment screen generating step generating and storing adjustment screen information in order to create a rule adjustment screen to be displayed on a display device for subsequent adjustments of the automatic control rules after each adjustment of the automatic control rule;

an adjustment screen displaying step creating the rule adjustment screen based on the adjustment screen information and displaying the rule adjustment screen on the display device upon adjusting the automatic control rule;

a rule adjustment operating step entering rule adjustment content via an operation on the displayed rule adjustment screen; and an adjusted rule updating step updating the data of the automatic control rule memory according to the rule adjustment content entered in the rule adjustment operating step, wherein the state of the air conditioner refers to environmental information of the air conditioner, which is input information entered into an air conditioner control device from the network, and the control content of the air conditioner refers to information indicating operation of said air conditioner, which is output information output to the network from the air conditioner control device;

the automatic control rule memory stores an input determination formula, an output-setting formula, and an input/output connection formula;

the input determination formula includes an input evaluation value and an operator defining a relationship of the input information with the input evaluation value and is a formula for determining whether or not the input information satisfies the input determination formula;

the output-setting formula includes an output-setting value, and is a formula for setting the output information based on the output-setting value;

the input/output connection formula defines a relationship between at least one of the input determination formula and at least one of the output-setting formula as connected when the relationship between the input determination formula and the output-setting formula exists; and in the control content determining step, updating the air-conditioning information based on the output-setting formula connected by the input/output connection formula when the input information satisfies the input determination formula.

14. A non-transitory computer-readable recording medium storing an air conditioner control program for controlling at least one air conditioner connected to a network, the air conditioner control program being adapted to cause a computer to execute:

an air-conditioning information receiving step receiving a control signal indicating a state of the air conditioner and storing data presenting the control signal in an air-conditioning information memory;

a control content determining step determining a control content of the air conditioner based on data of the air-conditioning information memory and data of an automatic control rule memory storing automatic control rules, and storing the determined control content in a corresponding part of the air-conditioning information memory as output information;

a control signal transmitting step transmitting the output information in the air-conditioning information memory to the network as a control signal for the air conditioner after the control content determining step;

an adjustment screen generating step generating and storing adjustment screen information in order to create a rule adjustment screen to be displayed on a display device for subsequent adjustments of the automatic control rules after each adjustment of the automatic control rule;

an adjustment screen displaying step creating the rule adjustment screen based on the adjustment screen information and displaying the rule adjustment screen on the display device upon adjusting the automatic control rule;

a rule adjustment operating step entering rule adjustment content via an operation on the displayed rule adjustment screen; and an adjusted rule updating step updating the data of the automatic control rule memory according to the rule adjustment content entered in the rule adjustment operating step, and wherein the state of the air conditioner refers to environmental information of the air conditioner, which is input information entered into an air conditioner control device from the network, and the control content of the air conditioner refers to information indicating operation of said air conditioner, which is output information output to the network from the air conditioner control device;

the automatic control rule memory stores an input determination formula, an output-setting formula, and an input/output connection formula;

the input determination formula includes an input evaluation value and an operator defining a relationship of the input information with the input evaluation value and is a formula for determining whether or not the input information satisfies the input determination formula;

the output-setting formula includes an output-setting value, and is a formula for setting the output information based on the output-setting value;

the input/output connection formula defines a relationship between at least one of the input determination formula and at least one of the output-setting formula as connected when the relationship between the input determination formula and the output-setting formula exists; and in the control content determining step, updating the air-conditioning information based on the output-setting formula connected by the input/output connection formula when the input information satisfies the input determination formula.

* * * * *